US012424774B2

(12) United States Patent
Hashiguchi

(10) Patent No.: US 12,424,774 B2
(45) Date of Patent: Sep. 23, 2025

(54) CONNECTOR

(71) Applicant: Japan Aviation Electronics Industry, Limited, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 286 days.

(21) Appl. No.: 18/351,106

(22) Filed: Jul. 12, 2023

(65) Prior Publication Data

US 2024/0088586 A1 Mar. 14, 2024

(30) Foreign Application Priority Data

Sep. 14, 2022 (JP) ................................ 2022-146204

(51) Int. Cl.
*H01R 12/65* (2011.01)
*H01R 12/77* (2011.01)
*H01R 107/00* (2006.01)

(52) U.S. Cl.
CPC .......... *H01R 12/65* (2013.01); *H01R 12/774* (2013.01); *H01R 2107/00* (2013.01)

(58) Field of Classification Search
None
See application file for complete search history.

(56) References Cited

U.S. PATENT DOCUMENTS

| | | | | | |
|---|---|---|---|---|---|
| 573,532 | A * | 12/1896 | Pringle | A44B 17/0052 24/681 |
| 10,096,918 | B1 * | 10/2018 | Nakamura | H01R 12/616 |
| 10,806,191 | B2 * | 10/2020 | Hashiguchi | H01R 12/613 |
| 10,868,380 | B1 * | 12/2020 | Komoto | H01R 12/771 |
| 10,886,650 | B1 * | 1/2021 | Komoto | H01R 12/592 |
| 10,899,293 | B2 * | 1/2021 | Furusawa | H01R 4/34 |
| 10,923,855 | B2 * | 2/2021 | Matsuo | H01R 12/771 |
| 11,024,993 | B2 * | 6/2021 | Nakamura | H01R 12/616 |
| 11,121,479 | B2 * | 9/2021 | Komoto | H01R 24/20 |
| 11,165,179 | B2 * | 11/2021 | Komoto | H01R 12/777 |
| 11,177,597 | B2 * | 11/2021 | Hashiguchi | H01R 12/592 |
| 11,183,781 | B2 * | 11/2021 | Komoto | H01R 9/2416 |
| 11,205,870 | B2 * | 12/2021 | Matsuo | H01R 12/69 |
| 11,211,726 | B2 * | 12/2021 | Komoto | H01R 12/778 |
| 11,258,189 | B2 * | 2/2022 | Hashiguchi | H01R 13/502 |
| 11,646,507 | B2 * | 5/2023 | Carlsson | H01R 9/20 439/37 |

(Continued)

FOREIGN PATENT DOCUMENTS

JP 2018129244 A 8/2018

*Primary Examiner* — Ross N Gushi
(74) *Attorney, Agent, or Firm* — MUNCY, GEISSLER, OLDS & LOWE, P.C.

(57) ABSTRACT

A connector includes a plug contact having a tubular portion extending along a fitting axis with a recessed portion formed therein and a flange extending from an end portion of the tubular portion in a direction orthogonal to the fitting axis, and an inner contact part of which is inserted in the recessed portion, the inner contact including a retaining portion contacting with an inner surface of the recessed portion to be electrically connected to the plug contact, a connecting portion facing a rear surface of the flange, and a spring portion joining the connecting portion to the retaining portion so as to be elastically displaceable along the fitting axis.

19 Claims, 17 Drawing Sheets

(56) References Cited

U.S. PATENT DOCUMENTS

| | | | | |
|---|---|---|---|---|
| 11,757,210 | B2 * | 9/2023 | Drexler | F16B 33/06 439/782 |
| 12,170,416 | B2 * | 12/2024 | Kimura | H01R 12/592 |
| 2018/0233854 | A1 | 8/2018 | Komoto et al. | |
| 2024/0072462 | A1 * | 2/2024 | Nakamura | H01R 12/592 |
| 2024/0072481 | A1 * | 2/2024 | Komoto | H01R 12/7011 |

* cited by examiner

CONNECTOR

BACKGROUND OF THE INVENTION

The present invention relates to a connector, particularly to a connector connected to a sheet type connection object having a conductor exposed on at least one surface of the connection object.

In recent years, attention has been drawn to so-called smart clothes that can obtain user's biological data such as the heart rate and the body temperature only by being worn by the user. Such a smart cloth has an electrode disposed at a measurement site, and when a wearable device serving as a measurement device is electrically connected to the electrode, biological data can be transmitted to the wearable device.

The electrode and the wearable device can be interconnected by, for instance, use of a connector connected to a conductor drawn from the electrode.

As a connector of this type, for example, JP 2018-129244 A discloses a connector shown in FIG. 34. This connector includes a housing 2 and a base member 3 that are separately disposed on opposite sides of a flexible substrate 1 to sandwich the flexible substrate 1. A tubular portion 4A of a contact 4 is passed through a contact through-hole 2A of the housing 2, and a flange 4B of the contact 4 is sandwiched between the housing 2 and a conductor 1A exposed on a front surface of the flexible substrate 1.

In this state, by pushing the base member 3 toward the housing 2, as shown in FIG. 35, a projection 3A of the base member 3 is inserted into a projection accommodating portion 4C of the contact 4 with the flexible substrate 1 being sandwiched therebetween, and an inner surface of the projection accommodating portion 4C makes contact with the conductor 1A with a predetermined contact force, whereby the contact 4 is electrically connected to the conductor 1A.

In addition, as shown in FIG. 34, the housing 2 and the base member 3 are fixed to each other by press-fitting a housing fixing post 3B, which is formed to project on the base member 3, into a post accommodating portion 2B of the housing 2.

When a wearable device is fitted with the connector disclosed in JP 2018-129244 A, the wearable device can be connected to an electrode formed of a conductor.

However, when the conductor 1A is exposed on the rear surface of the flexible substrate 1, the connector of JP 2018-129244A is useless for electrically connecting the flexible conductor 1A to the contact 4, disadvantageously.

SUMMARY OF THE INVENTION

The present invention has been made to solve the foregoing problem and aims at providing a connector that enables to make an electrical connection of a contact to a conductor of a connection object regardless of whether the conductor is exposed on the front surface or the rear surface of the connection object.

A connector according to the present invention comprises:

a plug contact having conductivity, the plug contact including a tubular portion extending along a fitting axis with a recessed portion formed therein, and a flange extending from an end portion of the tubular portion in a direction orthogonal to the fitting axis; and an inner contact having conductivity, part of the inner contact being inserted in the recessed portion, wherein the inner contact includes a retaining portion retained in the recessed portion and making contact with an inner surface of the recessed portion to be electrically connected to the plug contact, a connecting portion extending in the direction orthogonal to the fitting axis and facing a rear surface of the flange, and a spring portion joining the connecting portion to the retaining portion so as to be elastically displaceable along the fitting axis, and wherein part of a connection object of sheet shape having a conductor exposed on at least one surface of the connection object is sandwiched between the rear surface of the flange of the plug contact and the connecting portion of the inner contact in a direction along the fitting axis, the rear surface of the flange makes contact with a front surface of the connection object, and the connecting portion makes contact with a rear surface of the connection object, whereby the plug contact is electrically connected to the conductor directly when the conductor is exposed on the front surface of the connection object, and the plug contact is electrically connected to the conductor via the inner contact when the conductor is exposed on the rear surface of the connection object.

DETAILED DESCRIPTION OF THE INVENTION

Embodiments of the present invention are described below based on the accompanying drawings.

Embodiment 1

Figure 1:
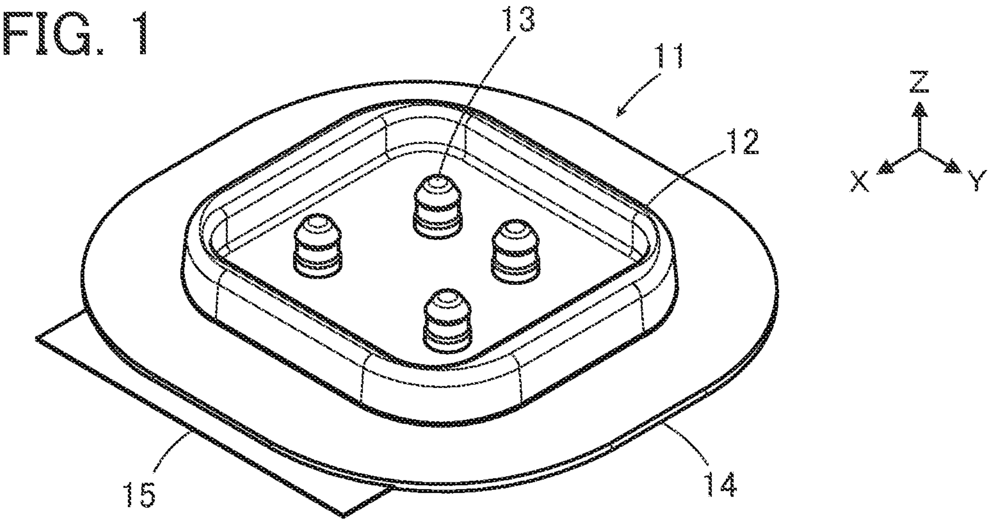
FIG. 1 is a perspective view showing a connector according to Embodiment 1.

FIG. 1 shows a connector 11 according to Embodiment 1. The connector 11 is used as, for example, a garment-side connector for fitting a wearable device, and has a housing 12 made of an insulating material. In the housing 12, four plug contacts 13 are retained, and a reinforcement sheet 14 and a sheet type conductive member 15 are retained by the housing 12 while being superposed on each other. The sheet type conductive member 15 constitutes a connection object that is connected to the contact 11.

The four plug contacts 13 are disposed to project perpendicularly to the sheet type conductive member 15 in two lines parallel to each other.

For convenience, the reinforcement sheet 14 and the sheet type conductive member 15 are defined as extending along an XY plane, the direction in which the four plug contacts 13 are aligned is referred to as "Y direction," and the direction in which the four plug contacts 13 project is referred to as "+Z direction." The Z direction is a fitting direction in which the connector 11 is fitted to a counter connector.

Figure 2:
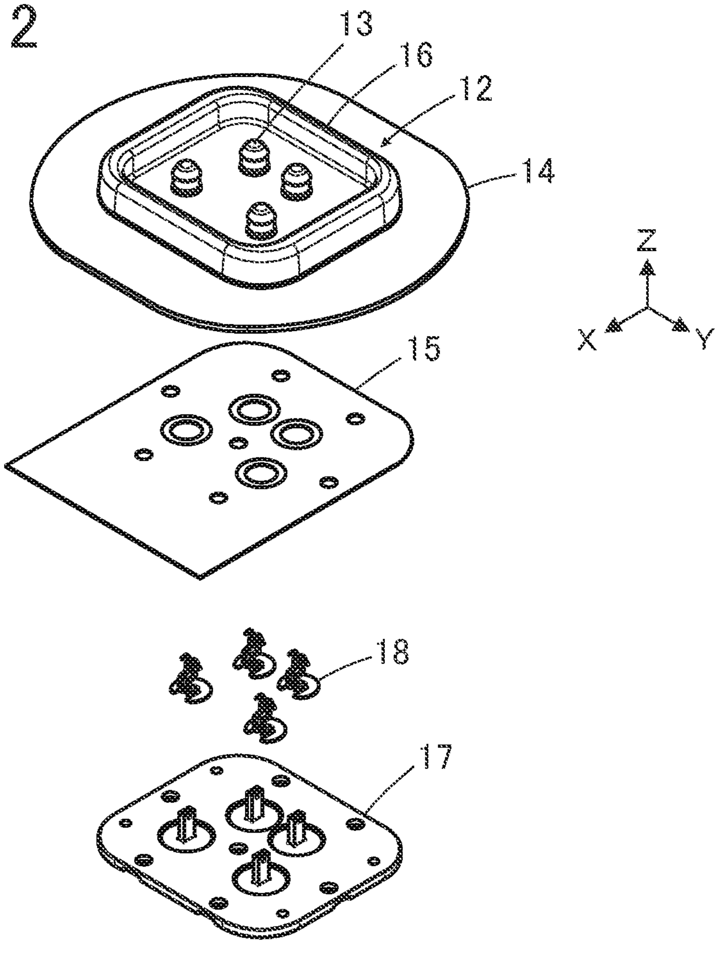
FIG. 2 is an exploded perspective view of the connector according to Embodiment 1.

FIG. 2 shows an exploded perspective view of the connector 11. The connector 11 includes a top insulator 16 and a bottom insulator 17, and these top and bottom insulators 16 and 17 constitute the housing 12.

The four plug contacts 13 are retained by the top insulator 16, the reinforcement sheet 14 is disposed a rear surface on the −Z direction side of the top insulator 16, and the sheet type conductive member 15 is disposed on the −Z direction side of the reinforcement sheet 14. Further, four inner contacts 18 are disposed on the −Z direction side of the sheet type conductive member 15, and the bottom insulator 17 is disposed on the −Z direction side of the inner contacts 18. The four inner contacts 18 separately correspond to the four plug contacts 13.

Figure 3:
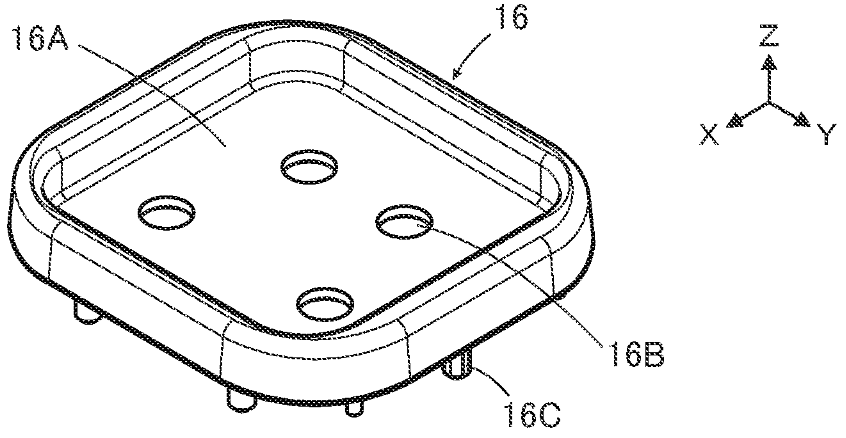
FIG. 3 is a perspective view showing a top insulator used in the connector of Embodiment 1.

As shown in FIG. 3, the top insulator 16 includes a recessed portion 16A opening in the +Z direction, and four contact through-holes 16B formed within the recessed portion 16A. The recessed portion 16A constitutes a counter connector accommodating portion in which part of a counter connector (not shown) is to be accommodated, and the four contact through-holes 16B separately correspond to the four plug contacts 13. In addition, on a surface facing in the −Z direction of the top insulator 16, a plurality of bosses 16C are formed to project in the −Z direction.

The four plug contacts 13 are each made of a conductive material such as metal, and are to be connected to corresponding contacts of a counter connector (not shown) when part of the counter connector is accommodated in the recessed portion 16A of the top insulator 16.

Figure 4:
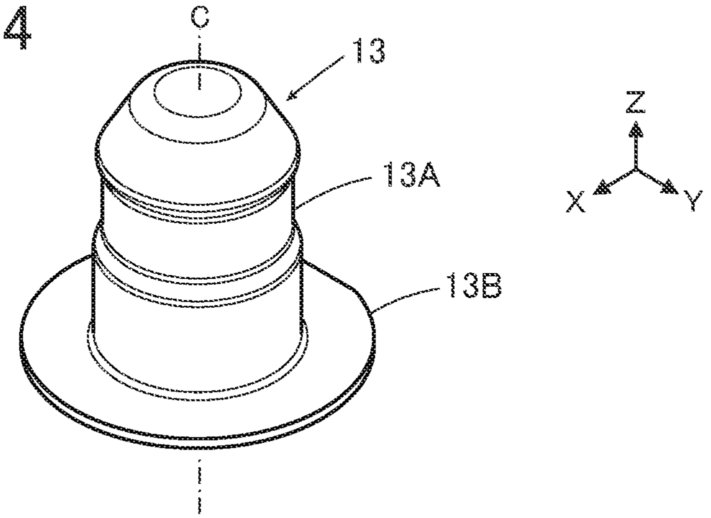
FIG. 4 is a perspective view showing a plug contact used in the connector of Embodiment 1.

As shown in FIG. 4, the plug contact 13 has a tubular portion 13A of cylindrical shape extending along a fitting axis C in the Z direction, and a flange 13B extending from a −Z directional end portion of the tubular portion 13A along an XY plane.

Figure 5:
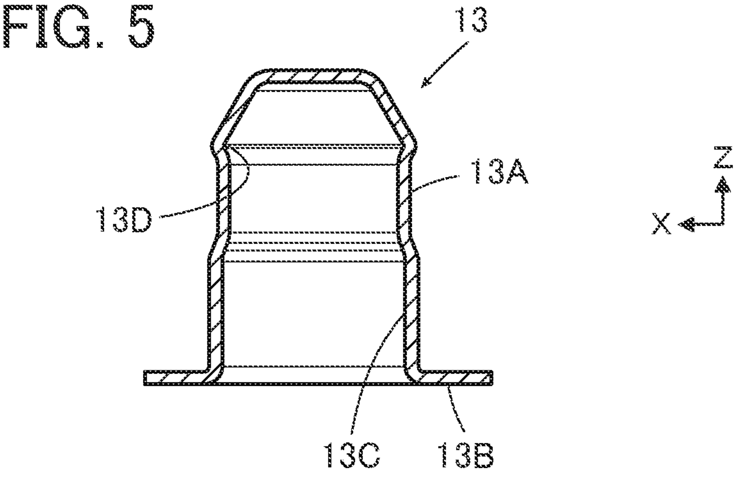
FIG. 5 is a cross-sectional view showing the plug contact used in the connector of Embodiment 1.

As shown in FIG. 5, the tubular portion 13A is provided in its interior with a recessed portion 13C opening in the −Z direction, and the recessed portion 13C is provided in its inside with a receiving portion 13D formed of a dent annularly extending in an XY plane along an inner surface of the recessed portion 13C.

It should be noted that the fitting axis C is an axis passing the center of the tubular portion 13A and extending in the fitting direction between the connector 11 and a counter connector.

While the tubular portion 13A has a cylindrical shape, the cross-sectional shape thereof is not limited to a circular shape, and the tubular portion 13A may have various cross-sectional shapes such as an elliptical shape and a polygonal shape as long as the tubular portion 13A is provided in its interior with the recessed portion 13C.

All the four plug contacts 13 may be each used as a terminal for transmitting an electric signal.

Figure 6:
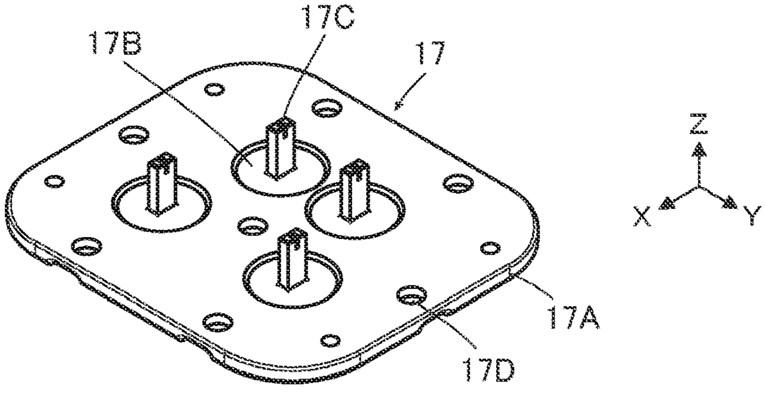
FIG. 6 is a perspective view showing a bottom insulator used in the connector of Embodiment 1.

As shown in FIG. 6, the bottom insulator 17 includes a flat plate portion 17A, and the flat plate portion 17A is provided with four circular recessed portions 17B opening in the +Z direction. The four recessed portions 17B separately correspond to the four plug contacts 13. The four recessed portions 17B are separately provided with four projections 17C projecting from center parts of the recessed portions 17B in the +Z direction.

In addition, the flat plate portion 17A is provided with a plurality of through-holes 17D separately corresponding to the plurality of bosses 16C of the top insulator 16.

Figure 7:
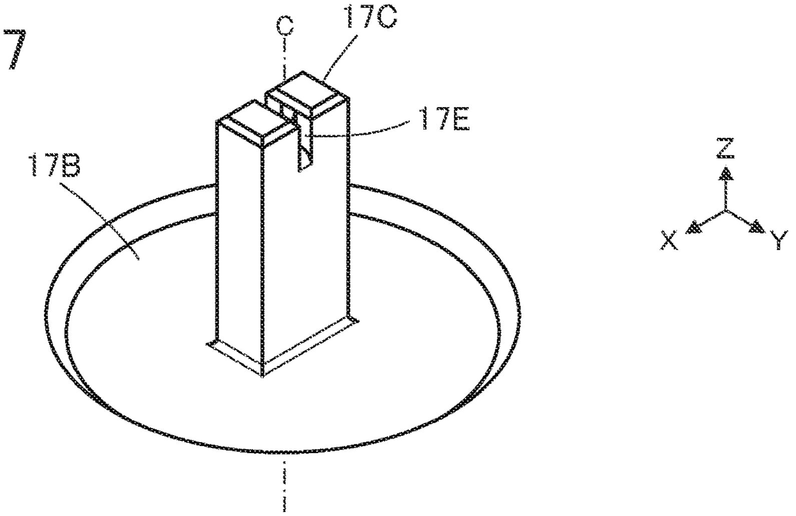
FIG. 7 is a perspective view showing a projection of the bottom insulator used in the connector of Embodiment 1.

As shown in FIG. 7, the projection 17C formed in the recessed portion 17B of the bottom insulator 17 has a quadrangular prism shape extending in the Z direction along the fitting axis C of the plug contact 13 disposed to correspond to the recessed portion 17B, and a retaining groove 17E crossing the projection 17C in the Y direction is formed at a +Z directional end portion of the projection 17C.

Figure 8:
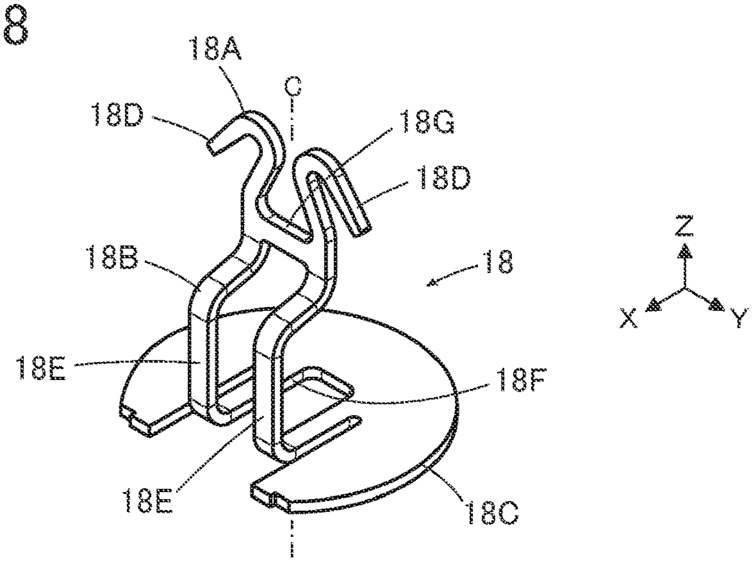
FIG. 8 is a perspective view showing an inner contact used in the connector of Embodiment 1.

As shown in FIG. 8, the inner contact 18 is formed of a single bent metal sheet having conductivity, and has a retaining portion 18A, a spring portion 18B connected to a −Z directional end portion of the retaining portion 18A, and a connecting portion 18C connected to a −Z directional end portion of the spring portion 18B. The retaining portion 18A and the spring portion 18B are inserted into the recessed portion 13C of the corresponding plug contact 13 when the connector 11 is assembled.

The retaining portion 18A has, in a YZ plane, a pair of hook portions 18D separately disposed on opposite sides of the fitting axis C of the corresponding plug contact 13. The pair of hook portions 18D have hook shapes projecting separately in the +Y direction and the −Y direction and facing in the −Z direction, and are disposed to be elastically displaceable in the Y direction orthogonal to a sheet thickness direction of a part of the metal sheet forming the hook portions 18D. It should be noted that in the state where no external force is applied to the pair of hook portions 18D, a distance between a +Y directional end portion and a −Y directional end portion of the pair of hook portions 18D is set to be slightly larger than the diameter of the recessed portion 13C of the plug contact 13.

The spring portion 18B is formed by a pair of band-like portions 18E extending in parallel to each other with a distance therebetween in the Y direction, extends in the Z direction along the fitting axis C while being bent in the X direction, and joins the connecting portion 18C to the retaining portion 18A in an elastically displaceable manner in the Z direction.

The connecting portion 18C has a substantially circular flat plate shape, and a rectangular cutout 18F for receiving the projection 17C of the bottom insulator 17 is formed at a center part of the connecting portion 18C.

In addition, the inner contact 18 has a beam portion 18G extending in the Y direction between the retaining portion 18A and the spring portion 18B. The beam portion 18G is disposed on the same position in an XY plane as the cutout 18F of the connecting portion 18C and joins −Z directional end portions of the pair of hook portions 18D to each other.

The inner contact 18 configured as above can be easily produced by, for example, cutting out a metal sheet into a predetermined shape and then bending the cut metal sheet.

The sheet type conductive member 15 has a multilayer structure in which a plurality of wiring layers each formed from a conductor and a plurality of insulating layers are laminated.

Figure 9:
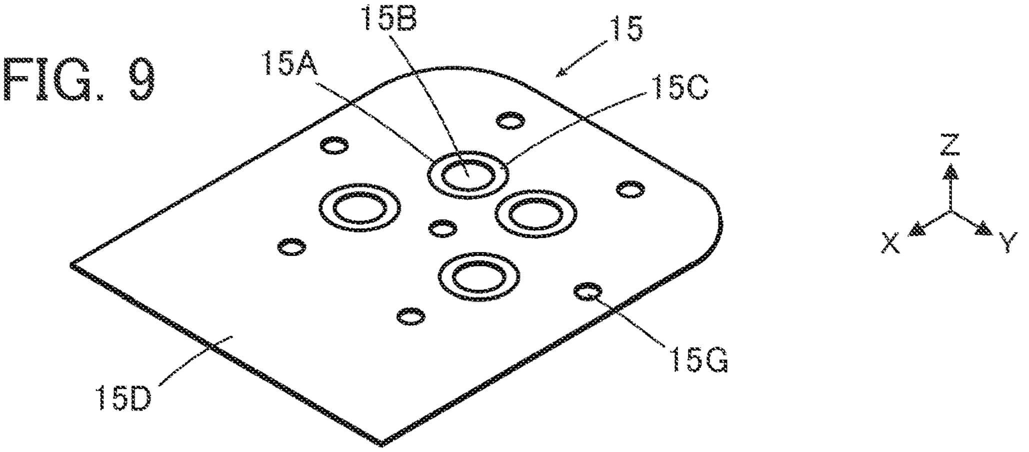
FIG. 9 is a perspective view of a connection object that is connected to the connector of Embodiment 1, as viewed from an obliquely upper position.

As shown in FIG. 9, four contact arrangement regions 15A for separately arranging the four plug contacts 13 are defined on a front surface, facing in the +Z direction, of the sheet type conductive member 15. At a center part of each of the contact arrangement regions 15A, a circular opening portion 15B is formed to penetrate the sheet type conductive member 15 in the Z direction, and around the opening portion 15B, a wiring layer 15C is exposed toward the +Z direction so as to surround the opening portion 15B. In the region excluding the four contact arrangement regions 15A, the insulating layer 15D is exposed.

Figure 10:
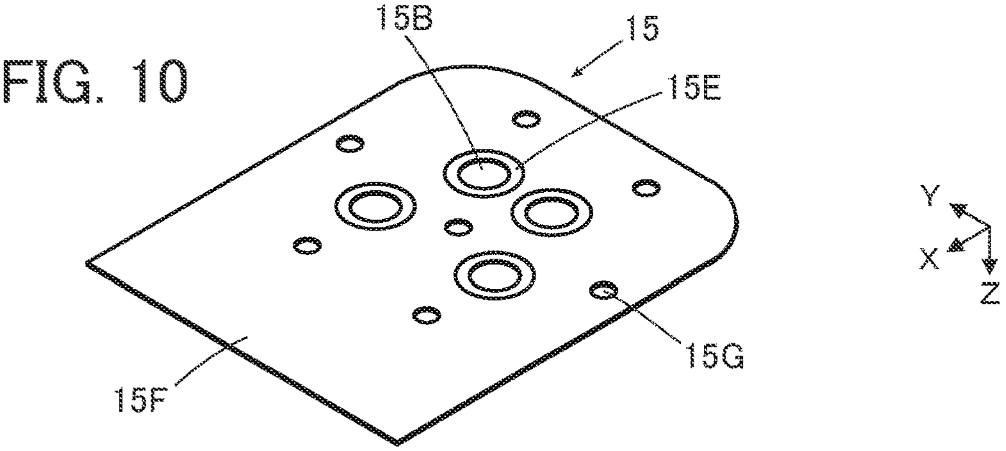
FIG. 10 is a perspective view of the connection object that is connected to the connector of Embodiment 1, as viewed from an obliquely lower position.

Since the opening portions 15B penetrate the sheet type conductive member 15 in the Z direction, as shown in FIG. 10, the opening portions 15B can be seen also on a rear surface, facing in the −Z direction, of the sheet type conductive member 15 at positions corresponding to the four contact arrangement regions 15A.

On the rear surface facing in the −Z direction of the sheet type conductive member 15, around each of the opening portions 15B formed at the positions corresponding to the four contact arrangement regions 15A, a wiring layer 15E is exposed toward the −Z direction so as to surround the opening portion 15B, and in the region excluding the opening portions 15B, an insulating layer 15F is exposed.

In addition, as shown in FIGS. 9 and 10, a plurality of through-holes 15G separately corresponding to the plurality of bosses 16C of the top insulator 16 are formed at a peripheral portion of the sheet type conductive member 15.

Figure 11:
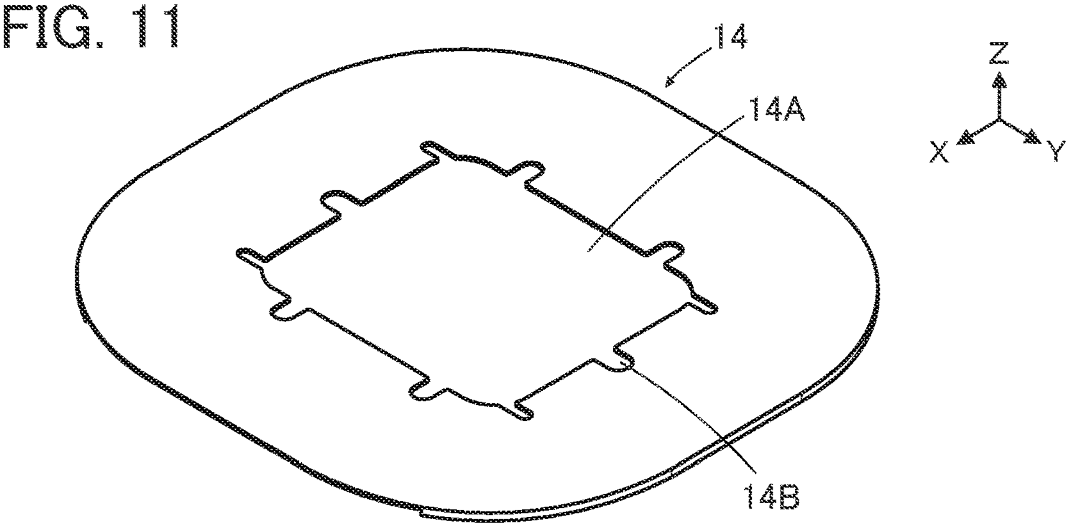
FIG. 11 is a perspective view showing a reinforcement sheet used in the connector of Embodiment 1.

As shown in FIG. 11, the reinforcement sheet 14 is provided to reinforce a mounting object such as a garment (not shown) on which the connector 11 is to be mounted, is made of an insulating material, and has an opening portion 14A formed in the center thereof. Further, a plurality of cutouts 14B separately corresponding to the plurality of bosses 16C of the top insulator 16 are formed along the periphery of the opening portion 14A of the reinforcement sheet 14.

The four contact through-holes 16B of the top insulator 16, the four plug contacts 13, the four contact arrangement regions 15A of the sheet type conductive member 15, the four inner contacts 18, and the four recessed portions 17B of the bottom insulator 17 are arranged so as to align with each other in the Z direction.

In addition, the bosses 16C of the top insulator 16, the cutouts 14B of the reinforcement sheet 14, the through-holes 15G of the sheet type conductive member 15, and the through-holes 17D of the bottom insulator 17 are arranged so as to align with each other in the Z direction.

Figure 12:
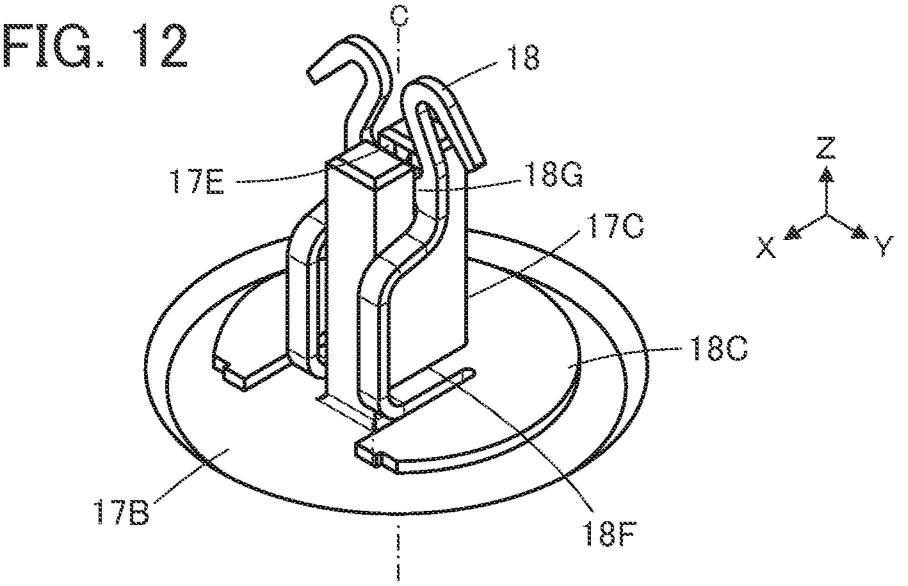
FIG. 12 is a perspective view showing the inner contact temporarily retained by the projection of the bottom insulator.

When the connector 11 is assembled, first, as shown in FIG. 12, the inner contact 18 is temporarily retained by the projection 17C of the corresponding recessed portion 17B of the bottom insulator 17. At this time, the inner contact 18 is pushed down from the +Z direction toward the −Z direction while the projection 17C is inserted into the cutout 18F of the connecting portion 18C of the inner contact 18, and the beam portion 18G is inserted into the retaining groove 17E of the projection 17C, whereby the inner contact 18 can be temporarily retained.

Likewise, each of the inner contacts 18 is temporarily retained by the projection 17C of the corresponding one of the four recessed portions 17B of the bottom insulator 17.

Next, the bosses 16C of the top insulator 16 are separately inserted into the cutouts 14B of the reinforcement sheet 14. At this time, the four contact through-holes 16B of the top insulator 16 are situated within the opening portion 14A of the reinforcement sheet 14.

Further, the tubular portion 13A of each of the plug contacts 13 is inserted from the −Z direction into the corresponding one of the four contact through-holes 16B of the top insulator 16, and the bottom insulator 17 is pressed against the top insulator 16 in the +Z direction with the sheet type conductive member 15 being sandwiched therebetween.

At this time, the retaining portion 18A and the spring portion 18B of the inner contact 18 temporarily retained by the projection 17C of the bottom insulator 17 are inserted into the recessed portion 13C of the corresponding plug contact 13 through the opening portion 15B of the sheet type conductive member 15, the flange 13B of the plug contact 13 is situated on the corresponding contact arrangement region 15A of the sheet type conductive member 15, and the sheet type conductive member 15 is sandwiched between a front surface on the +Z direction side of the connecting portion 18C of the inner contact 18 and a rear surface on the −Z direction side of the flange 13B of the plug contact 13.

Figure 13:
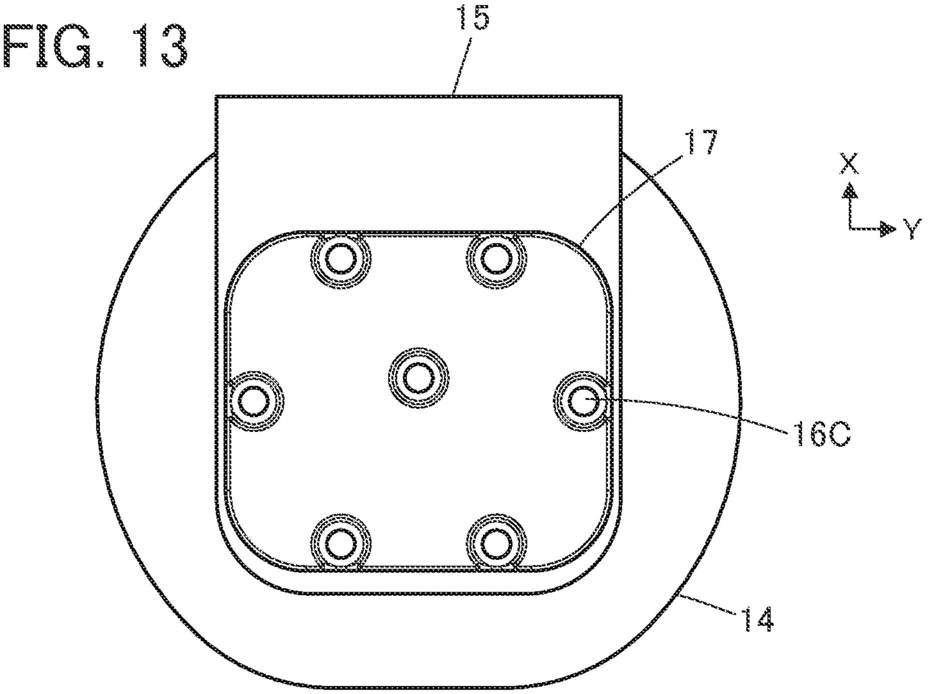
FIG. 13 is a bottom view showing the connector of Embodiment 1.

In addition, by pressing the bottom insulator 17 against the top insulator 16, the bosses 16C of the top insulator 16 sequentially penetrate the cutouts 14B of the reinforcement sheet 14, the through-holes 15G of the sheet type conductive member 15, and the through-holes 17D of the bottom insulator 17. Thereafter, as shown in FIG. 13, the top insulator 16 and the bottom insulator 17 are fixed to each other through heat deformation of a tip of each of the plurality of bosses 16C projecting on the −Z direction side of the bottom insulator 17. Thus, the assembling operation of the connector 11 is completed.

Figure 14:
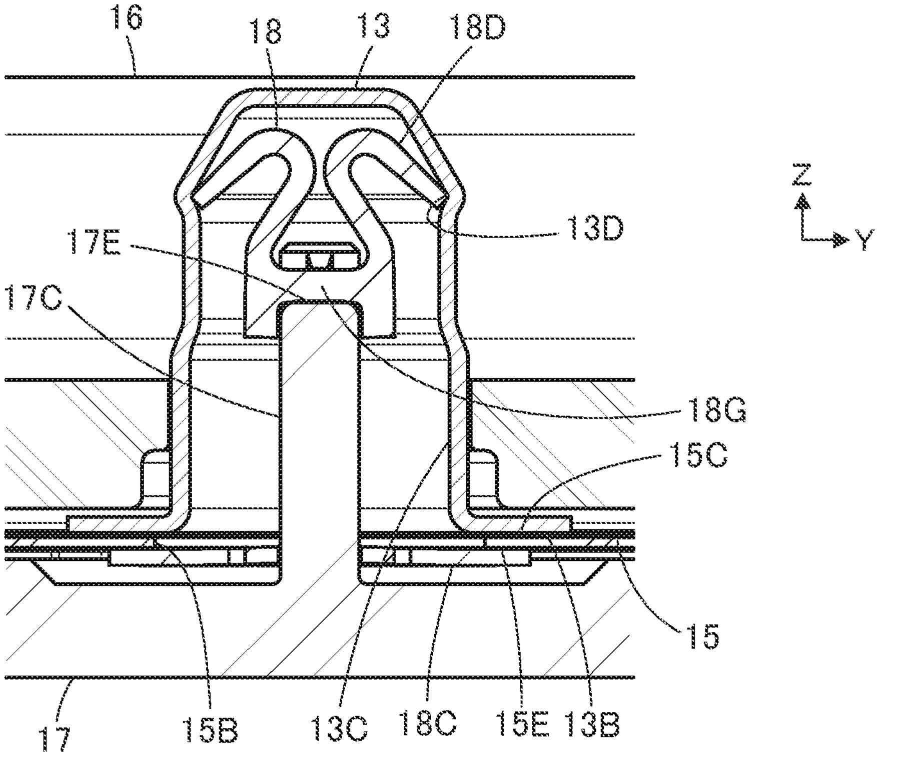
FIG. 14 is a partial cross-sectional side view of the connector of Embodiment 1 connected to the connection object, showing a state of an inside of the plug contact into which the inner contact is inserted.
Figure 15:
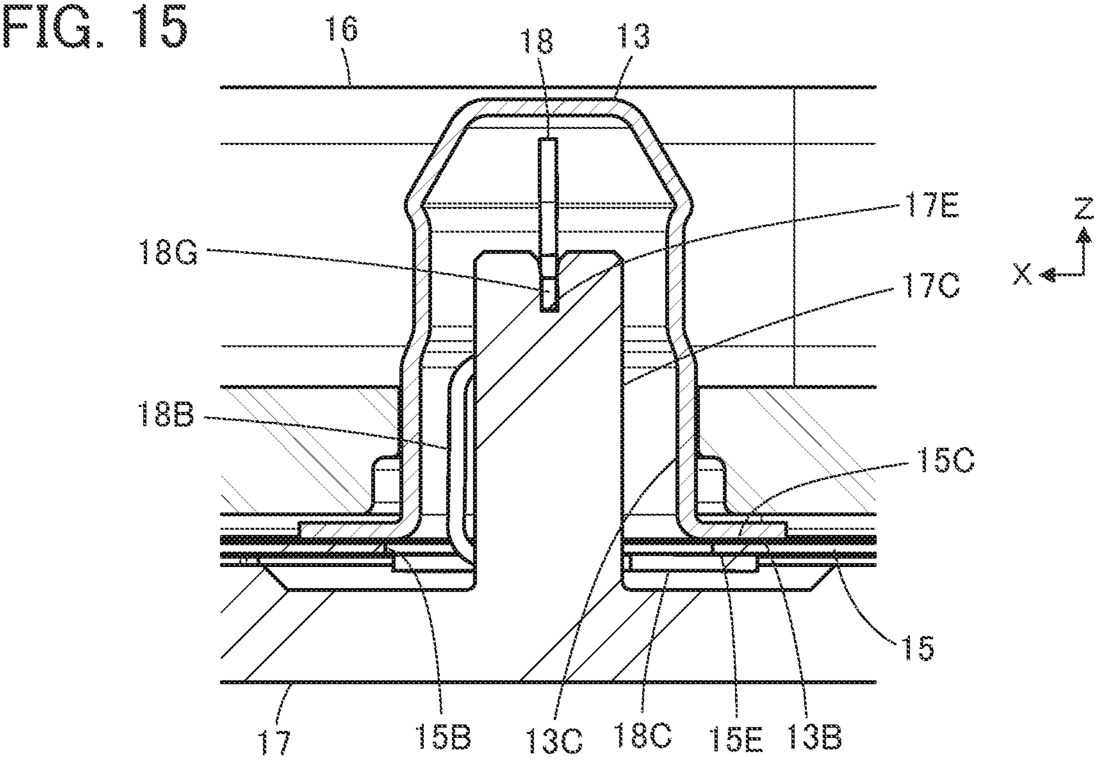
FIG. 15 is a partial cross-sectional side view of the connector of Embodiment 1 connected to the connection object, showing the state of the inside of the plug contact into which the inner contact is inserted, as viewed from a direction different from FIG. 14.

As shown in FIGS. 14 and 15, when the beam portion 18G of the inner contact 18 is pushed up in the +Z direction by the projection 17C of the bottom insulator 17, the pair of hook portions 18D constituting the retaining portion 18A of the inner contact 18 move in the +Z direction within the recessed portion 13C of the plug contact 13 while being elastically displaced in the Y direction, and are received by the receiving portion 13D formed inside the recessed portion 13C. Consequently, the retaining portion 18A of the inner contact 18 is retained in the recessed portion 13C of the plug contact 13, and the pair of hook portions 18D are pressed against the inner surface of the recessed portion 13C of the plug contact 13, whereby the inner contact 18 is electrically connected to the plug contact 13.

It should be noted that instead of pushing up the beam portion 18G of the inner contact 18 by the projection 17C of the bottom insulator 17, the beam portion 18G of the inner contact 18 may be pushed up in the +Z direction using a jig (not shown). In this case, the bottom insulator 17 may have no projection 17C.

At this time, an elastic force acting in the +Z direction is applied to the connecting portion 18C by the spring portion 18B of the inner contact 18, which spring portion 18B joins the retaining portion 18A and the connecting portion 18C together. Since the sheet type conductive member 15 is sandwiched between the flange 13B of the plug contact 13 and the connecting portion 18C of the inner contact 18, a front surface on the +Z direction side of the sheet type conductive member 15 is pressed against the rear surface of the flange 13B of the plug contact 13, while a rear surface on the −Z direction side of the sheet type conductive member 15 is pressed against the front surface of the connecting portion 18C of the inner contact 18.

Here, as shown in FIGS. 9 and 10, in the contact arrangement regions 15A on the front surface of the sheet type conductive member 15, the wiring layer 15C is exposed around each of the opening portions 15B, and on the rear surface of the sheet type conductive member 15, the wiring layer 15E is exposed around each of the opening portions 15B disposed at the positions corresponding to the contact arrangement regions 15A.

Therefore, the wiring layer 15C on the front surface of the sheet type conductive member 15 makes contact with the rear surface of the flange 13B of the plug contact 13 with predetermined contact pressure, while the wiring layer 15E on the rear surface of the sheet type conductive member 15 makes contact with the front surface of the connecting portion 18C of the inner contact 18 with predetermined contact pressure.

Therefore, the wiring layer 15C exposed on the front surface of the sheet type conductive member 15 is electrically connected to the plug contact 13 directly, while the wiring layer 15E exposed on the rear surface of the sheet type conductive member 15 is electrically connected to the plug contact 13 via the inner contact 18. That is, both the wiring layers 15C and 15E are connected to the plug contact 13.

Thus, with the connector 11, by using the inner contact 18, both the wiring layer 15C and the wiring layer 15E formed of the conductors disposed on the front surface side and the rear surface side of the sheet type conductive member 15 can be electrically connected to the single plug contact 13.

Therefore, when the connector 11 is connected to a sheet type conductive member having a conductor exposed only on its front surface side, the plug contact 13 can be electrically connected to the conductor on the front surface side of the sheet type conductive member. On the other hand, when the connector 11 is connected to a sheet type conductive member having a conductor exposed only on its rear surface side, the plug contact 13 can be electrically connected to the conductor on the rear surface side of the sheet type conductive member.

Further, when the connector 11 is connected to a sheet type conductive member having conductors separately exposed on its front surface side and rear surface side like the sheet type conductive member 15 in Embodiment 1 above, the plug contact 13 can be electrically connected to both the conductors on the front surface side and the rear surface side of the sheet type conductive member. For example, with a connection object being a sheet type conductive member having a multilayer structure, in which conductors constituting shield layers are separately exposed on the front surface side and the rear surface side thereof, and a conductor constituting a signal wiring layer is disposed between these shield layers such that the conductor is insulated from both the shield layers, a shield effect with respect to the signal wiring layer is exhibited when the plug contact 13 connected to the shield layers on the front surface side and the rear surface side is connected to a ground potential, and it is possible to carry out highly accurate signal transmission with reduced influence of external disturbances caused by, for example, electromagnetic waves.

It should be noted that the flange 13B of each of the plug contacts 13 is sandwiched between the top insulator 16 and the bottom insulator 17 so that the plug contacts 13 are fixed to the top insulator 16 and the bottom insulator 17.

Figure 16:
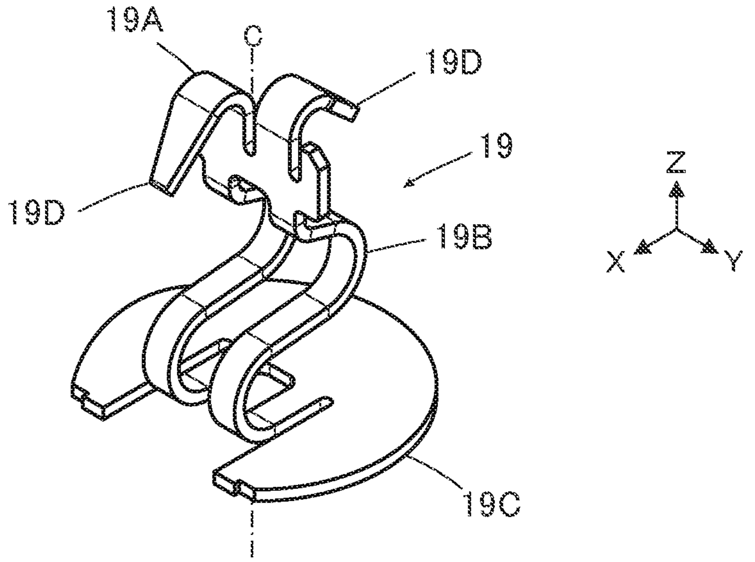
FIG. 16 is a perspective view showing an inner contact used in a connector according to a modification of Embodiment 1.

FIG. 16 shows an inner contact 19 used in a connector according to a modification of Embodiment 1.

As with the inner contact 18 in Embodiment 1, the inner contact 19 is formed of a single bent metal sheet having conductivity and includes a retaining portion 19A, a spring portion 19B connected to a −Z directional end portion of the retaining portion 19A, and a connecting portion 19C connected to a −Z directional end portion of the spring portion 19B.

The retaining portion 19A has a pair of hook portions 19D projecting separately in the +X direction and −X direction. These hook portions 19D are formed by curving the metal sheet forming the inner contact 19 in the X direction that is a sheet thickness direction of the metal sheet, and are disposed to be elastically displaceable in the sheet thickness direction of a part of the metal sheet forming the hook portions 19D.

As with the inner contact 18 in Embodiment 1, the spring portion 19B joins the connecting portion 19C to the retaining portion 19A in an elastically displaceable manner in the Z direction, and the connecting portion 19C has a substantially circular flat plate shape.

Even when the inner contact 19 shown in FIG. 16 is used in place of the inner contact 18 in the connector 11 of Embodiment 1, both the wiring layer 15C and the wiring layer 15E respectively disposed on the front surface side and the rear surface side of the sheet type conductive member 15 can be also electrically connected to the plug contact 13.

Since the pair of hook portions 19D are disposed to be elastically displaceable in the sheet thickness direction of the part of the metal sheet forming the hook portions 19D, the inner contact 19 is configured to be elastically displaced more easily than the pair of hook portions 18D of the inner contact 18 in Embodiment 1, and the connector 11 can be assembled with small assembling force.

Embodiment 2

Figure 17:
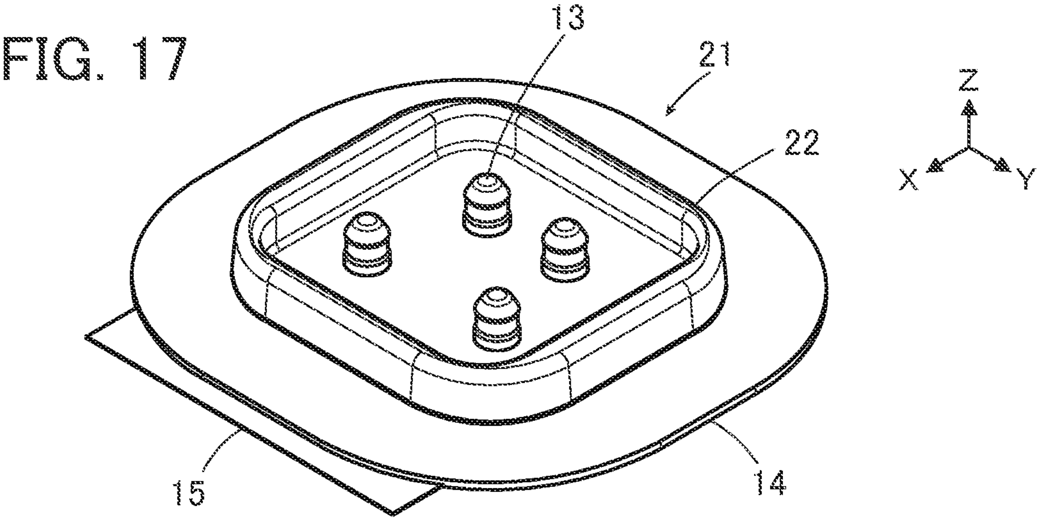
FIG. 17 is a perspective view showing a connector according to Embodiment 2.

FIG. 17 shows a connector 21 according to Embodiment 2. As with the connector 11 of Embodiment 1, the connector 21 includes a housing 22 made of an insulating material, and in the housing 22, the four plug contacts 13 are retained, and the reinforcement sheet 14 and the sheet type conductive member 15 are retained by the housing 22 while being superposed on each other.

The plug contacts 13, the reinforcement sheet 14, and the sheet type conductive member 15 are the same as those used in Embodiment 1.

Figure 18:
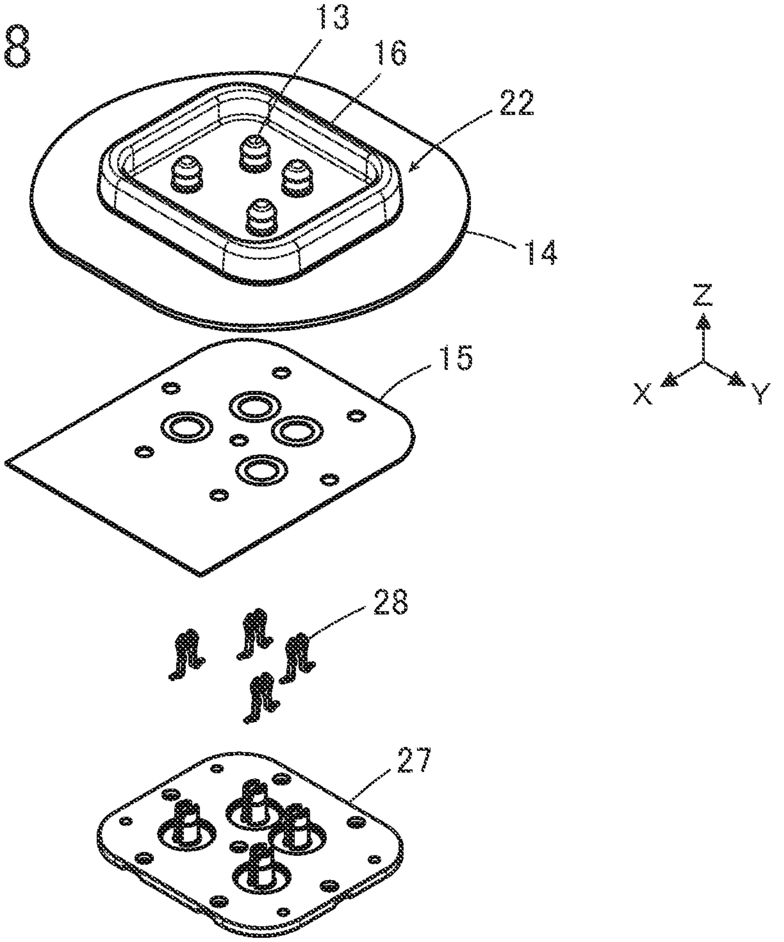
FIG. 18 is an exploded perspective view of the connector according to Embodiment 2.

FIG. 18 shows an exploded perspective view of the connector 21. The connector 21 includes the top insulator 16 used in Embodiment 1, and a bottom insulator 27, and these top and bottom insulators 16 and 27 constitute the housing 22.

Four inner contacts 28 are disposed on the −Z direction side of the sheet type conductive member 15, and the bottom insulator 27 is disposed on the −Z direction side of the inner contacts 28.

Figure 19:
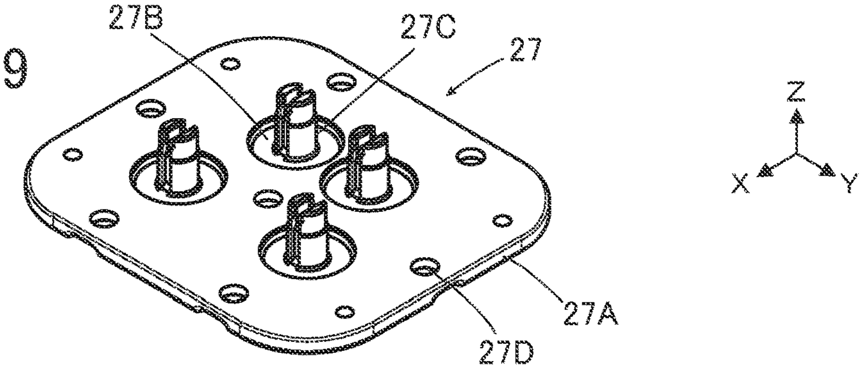
FIG. 19 is a perspective view showing a bottom insulator used in the connector of Embodiment 2.

As shown in FIG. 19, the bottom insulator 27 includes a flat plate portion 27A, and the flat plate portion 27A is provided with four circular recessed portions 27B opening in the +Z direction. The four recessed portions 27B are separately provided with four projections 27C projecting in the +Z direction from center parts of the recessed portions 27B.

In addition, the flat plate portion 27A is provided with a plurality of through-holes 27D separately corresponding to the plurality of bosses 16C of the top insulator 16.

Figure 20:
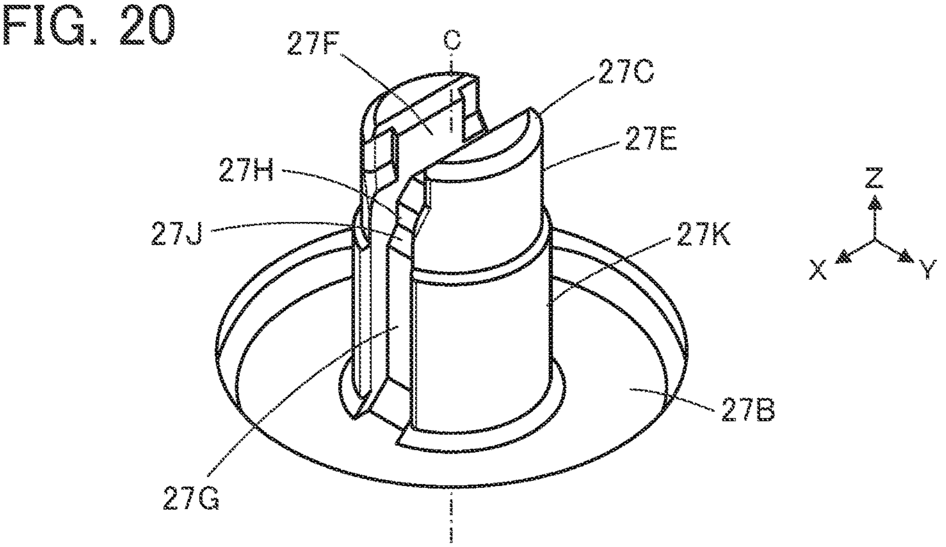
FIG. 20 is a perspective view showing a projection of the bottom insulator used in the connector of Embodiment 2.

As shown in FIG. 20, the projection 27C formed in the recessed portion 27B of the bottom insulator 27 has a large diameter portion 27K disposed on the −Z direction side, and a small diameter portion 27E joined to the large diameter portion 27K on the +Z direction side of the large diameter portion 27K. The large diameter portion 27K and the small diameter portion 27E both have a columnar shape with the center thereof coinciding with the fitting axis C of the plug contact 13 disposed to correspond to the recessed portion 27B, and the small diameter portion 27E has a diameter smaller than that of the large diameter portion 27K.

In addition, a retaining groove 27F extending across the small diameter portion 27E in the X direction is formed at an upper surface, facing in the +Z direction, of the small diameter portion 27E. The retaining groove 27F is configured to temporarily retain the inner contact 28 and extends not only in the upper surface of the small diameter portion 27E but also in side parts of the small diameter portion 27E and the large diameter portion 27K. A first cam surface 27G extending along a YZ plane is formed, by a bottom portion of the retaining grooves 27F, at each of opposite side portions in the X direction of the large diameter portion 27K, and a second cam surface 27H extending along a YZ plane and situated closer to the fitting axis C than the first cam surface 27G is formed at each of opposite side portions in the X direction of the small diameter portion 27E. Further, a step portion 27J inclined to face the +Z direction is formed at a boundary portion between the first cam surface 27G and the second cam surface 27H.

Figure 21:
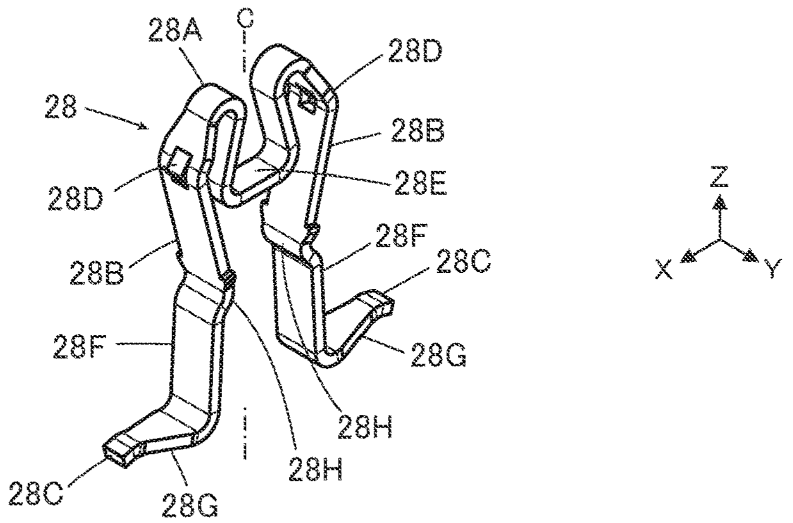
FIG. 21 is a perspective view showing an inner contact used in the connector of Embodiment 2.

As shown in FIG. 21, the inner contact 28 is formed of a single bent metal sheet of band shape and having conductivity and includes a retaining portion 28A having a pair of hook portions 28D, a pair of spring portions 28B separately connected to the pair of hook portions 28D, and a pair of connecting portions 28C separately connected to the pair of spring portions 28B.

The retaining portion 28A extends from a joint portion 28E situated on the fitting axis C while being bent at opposite sides in the X direction, and the pair of hook portions 28D are formed at opposite ends in the X direction of the retaining portion 28A. The pair of hook portions 28D are separately disposed on opposite sides across the fitting axis C of the corresponding plug contact 13 and are formed by cutting parts of the metal sheet forming the inner contact 28 and lifting the parts.

The pair of spring portions 28B are separately disposed on the opposite sides across the fitting axis C such that the spring portions 28B face each other in the X direction, and each of the pair of spring portions 28B has an extending portion 28F extending in the −Z direction from the corresponding hook portion 28D, and an arm portion 28G being bent at a −Z directional end portion of the extending portion 28F and extending in the X direction to be separated away from the fitting axis C. A pair of bent portions 28H projecting toward the fitting axis C to approach each other are separately formed at intermediate parts in the Z direction of the extending portions 28F of the pair of spring portions 28B.

The pair of connecting portions 28C are separately disposed at tips of the arm portions 28G of the pair of spring portions 28B.

The four contact through-holes 16B of the top insulator 16, the four plug contacts 13, the four contact arrangement regions 15A of the sheet type conductive member 15, the four inner contacts 28, and the four recessed portions 27B of the bottom insulator 27 are arranged so as to align with each other in the Z direction.

In addition, the bosses 16C of the top insulator 16, the cutouts 14B of the reinforcement sheet 14, the through-holes 15G of the sheet type conductive member 15, and the through-holes 27D of the bottom insulator 27 are arranged so as to align with each other in the Z direction.

Figure 22:
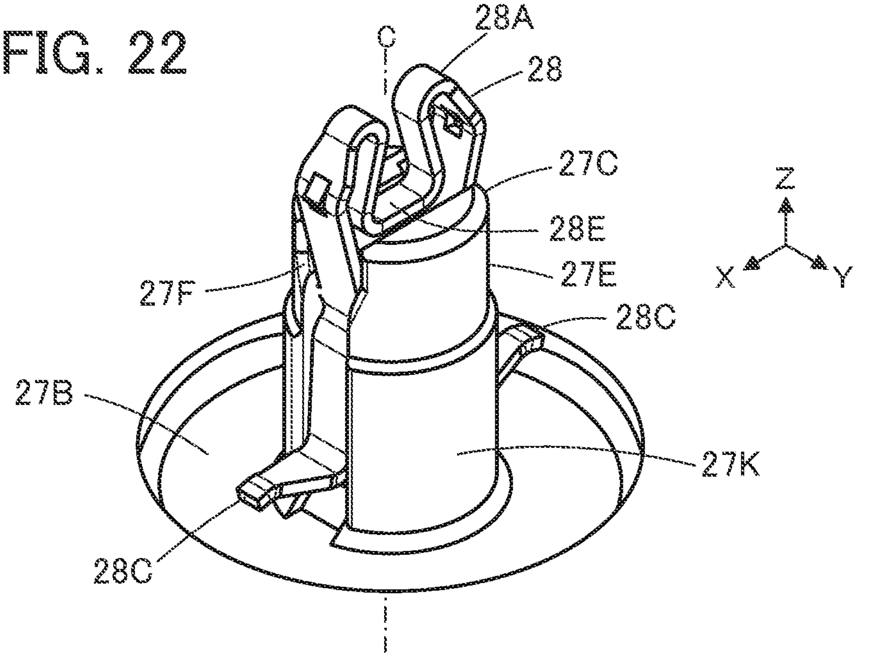
FIG. 22 is a perspective view showing the inner contact temporarily retained by the projection of the bottom insulator.

When the connector 21 is assembled, first, as shown in FIG. 22, the inner contact 28 is temporarily retained by the projection 27C of the corresponding recessed portion 27B of the bottom insulator 27. Specifically, the joint portion 28E is inserted into the retaining groove 27F of the projection 27C, and the inner contact 28 is temporarily retained with respect to the projection 27C such that the bent portions 28H of the pair of spring portions 28B make contact with the second cam surfaces 27H and the step portions 27J of the projection 27C.

Similarly, the inner contacts 28 are temporarily retained separately by the projections 27C of the four recessed portions 27B of the bottom insulator 27.

Next, the bosses 16C of the top insulator 16 are separately inserted into the cutouts 14B of the reinforcement sheet 14, the tubular portion 13A of each of the plug contacts 13 is inserted from the −Z direction into the corresponding one of the four contact through-holes 16B of the top insulator 16, and the bottom insulator 27 is pressed toward the top insulator 16 in the +Z direction with the sheet type conductive member 15 being sandwiched therebetween.

Figure 23:
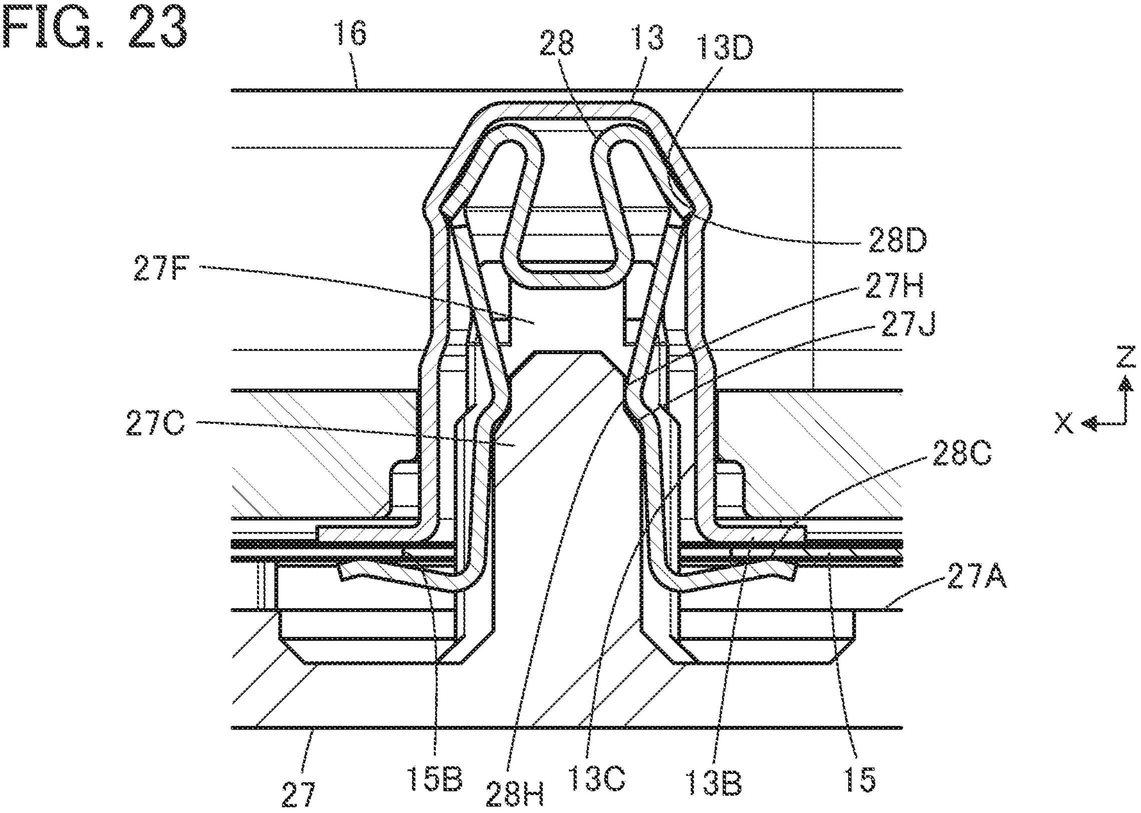
FIG. 23 is a partial cross-sectional side view of the connector of Embodiment 2 in the process of assembling, showing a state of an inside of the plug contact into which the inner contact is inserted.

At this time, as shown in FIG. 23, the retaining portion 28A of the inner contact 28 temporarily retained by the projection 27C of the bottom insulator 27 is inserted into the recessed portion 13C of the corresponding plug contact 13 through the opening portion 15B of the sheet type conductive member 15, and the pair of hook portions 28D disposed at the retaining portion 28A move in the +Z direction within the recessed portion 13C of the plug contact 13 while being elastically displaced in the Y direction and is received by the receiving portion 13D formed inside the recessed portion 13C. Consequently, the retaining portion 28A of the inner contact 28 is retained in the recessed portion 13C of the plug contact 13, and the pair of hook portions 28D are pressed against the inner surface of the recessed portion 13C of the plug contact 13, whereby the inner contact 28 is electrically connected to the plug contact 13.

In addition, the flange 13B of the plug contact 13 is situated on the corresponding contact arrangement region 15A of the sheet type conductive member 15, and the sheet type conductive member 15 is sandwiched between front surfaces on the +Z direction side of the pair of connecting portions 28C of the inner contact 28 and a rear surface on the −Z direction side of the flange 13B of the plug contact 13.

However, as shown in FIG. 23, a front surface on the +Z direction side of the flat plate portion 27A of the bottom insulator 27 does not make contact with the rear surface on the −Z direction side of the sheet type conductive member 15, and a gap is still formed between these surfaces.

In this state, the bottom insulator 27 is further pressed toward the top insulator 16 in the +Z direction until the flat plate portion 27A of the bottom insulator 27 makes contact with the sheet type conductive member 15. Consequently, the bosses 16C of the top insulator 16 sequentially penetrate the cutouts 14B of the reinforcement sheet 14, the through-holes 15G of the sheet type conductive member 15, and the through-holes 27D of the bottom insulator 27. Thereafter, the top insulator 16 and the bottom insulator 27 are fixed to each other through heat deformation of a tip of each of the plurality of bosses 16C projecting on the −Z direction side of the bottom insulator 27. Thus, the assembling operation of the connector 21 is completed.

Figure 24:
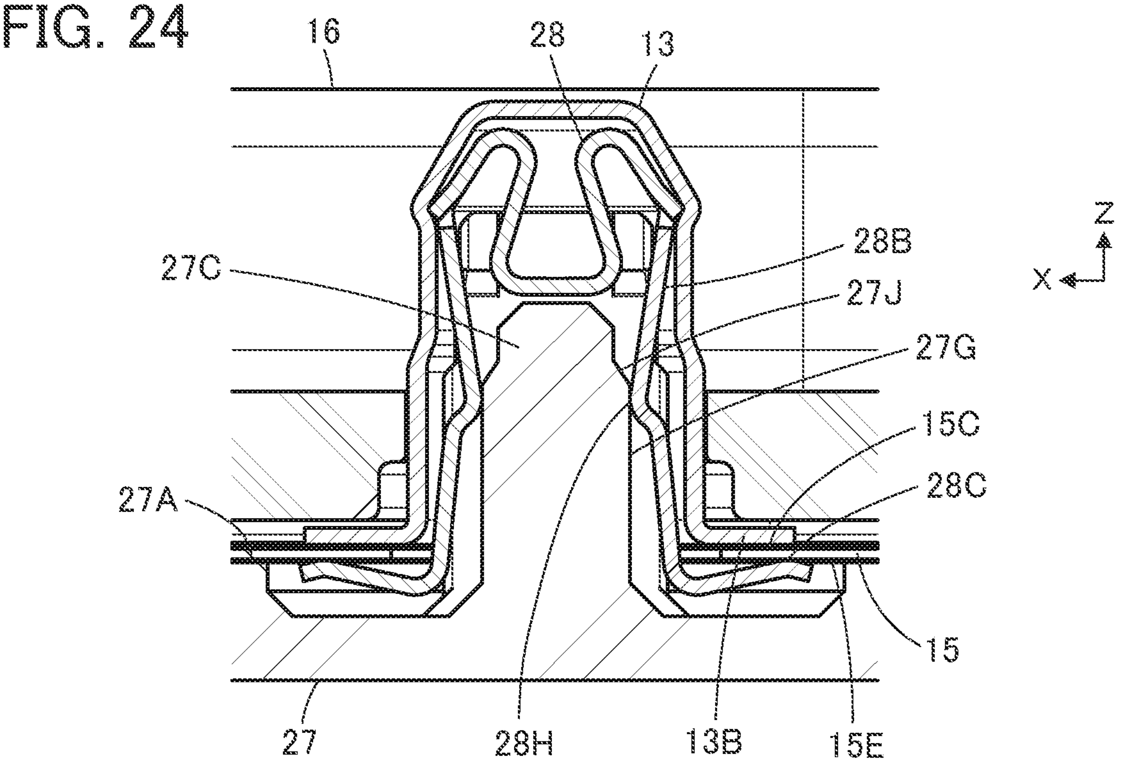
FIG. 24 is a partial cross-sectional side view of the connector of Embodiment 2 connected to the connection object, showing a state of the inside of the plug contact into which the inner contact is inserted.

By pressing the bottom insulator 27 toward the top insulator 16 until the flat plate portion 27A of the bottom insulator 27 makes contact with the sheet type conductive member 15, as shown in FIG. 24, the projection 27C of the bottom insulator 27 moves in the +Z direction relatively to the inner contact 28, and the bent portions 28H of the pair of spring portions 28B of the inner contact 28 go over the step portions 27J of the projection 27C and make contact with the first cam surfaces 27G.

Since the first cam surfaces 27G are disposed to be separated farther from the fitting axis C than the second cam surfaces 27H are, the pair of spring portions 28B of the inner contact 28 are elastically displaced in the X direction such that the gap therebetween is widened, whereby a pressing force acting in the +Z direction is applied to the connecting portions 28C separately disposed at the tips of the spring portions 28B.

Since the sheet type conductive member 15 is sandwiched between the flange 13B of the plug contact 13 and the connecting portions 28C of the inner contact 28, the front surface on the +Z direction side of the sheet type conductive member 15 is pressed against the rear surface of the flange 13B of the plug contact 13, while the rear surface on the −Z direction side of the sheet type conductive member 15 is pressed against the front surfaces of the connecting portions 28C of the inner contact 28. Thus, the wiring layer 15C on the front surface of the sheet type conductive member 15 makes contact with the rear surface of the flange 13B of the plug contact 13 with predetermined contact pressure, while the wiring layer 15E on the rear surface of the sheet type conductive member 15 makes contact with the front surfaces of the connecting portions 28C of the inner contact 28 with predetermined contact pressure.

Therefore, the wiring layer 15C exposed on the front surface of the sheet type conductive member 15 is electrically connected to the plug contact 13 directly, while the wiring layer 15E exposed on the rear surface of the sheet type conductive member 15 is electrically connected to the plug contact 13 via the inner contact 28. That is, both the wiring layers 15C and 15E are connected to the plug contact 13.

Thus, also with the connector 21 of Embodiment 2, both the wiring layer 15C and the wiring layer 15E formed of the conductor disposed on the front surface side and the conductor disposed on the rear surface side of the sheet type conductive member 15 can be electrically connected to the single plug contact 13.

In Embodiment 2 above, after the inner contact 28 is temporarily retained by the projection 27C of the bottom insulator 27, the bottom insulator 27 is pressed toward the top insulator 16 with the sheet type conductive member 15 being sandwiched therebetween, but the invention is not limited thereto. The connector 21 can also be assembled by, for example, first inserting the inner contact 28 into the recessed portion 13C of the plug contact 13 with the sheet type conductive member 15 being sandwiched therebetween, and then pressing the bottom insulator 27 toward the top insulator 16.

In this case, the projection 27C of the bottom insulator 27 may have only the first cam surfaces 27G and no second cam surfaces 27H and step portions 27J. However, when the projection 27 having not only the first cam surfaces 27G but also the second cam surfaces 27H and the step portions 27J is used as in Embodiment 2, the first cam surfaces 27G are easily inserted between the pair of bent portions 28H of the inner contact 28, and the connector 21 can be easily assembled.

Embodiment 3

Figure 25:
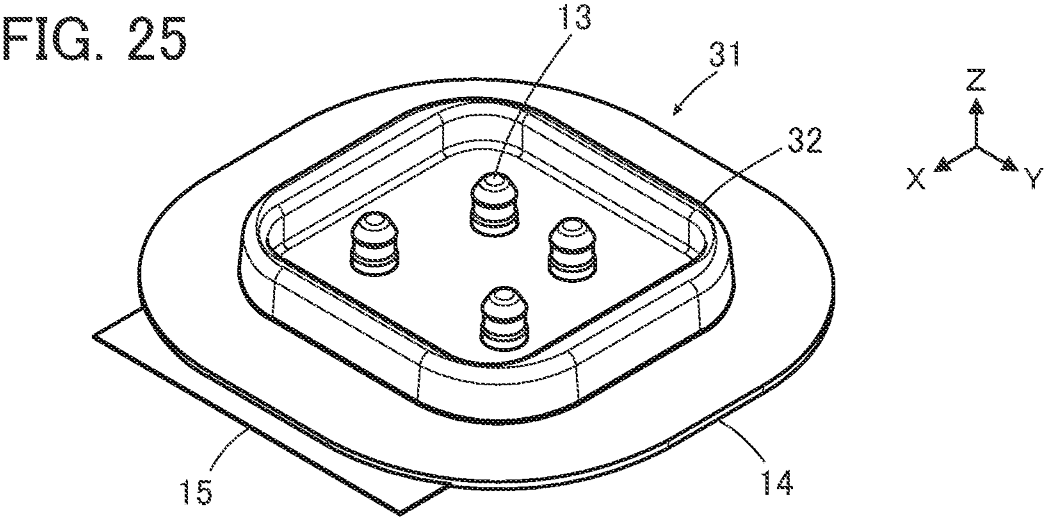
FIG. 25 is a perspective view showing a connector according to Embodiment 3.

FIG. 25 shows a connector 31 according to Embodiment 3. As with the connector 11 of Embodiment 1, the connector 31 includes a housing 32 made of an insulating material, and in the housing 32, the four plug contacts 13 are retained, and the reinforcement sheet 14 and the sheet type conductive member 15 are retained by the housing 32 while being superposed on each other.

The plug contacts 13, the reinforcement sheet 14, and the sheet type conductive member 15 are the same as those used in Embodiment 1.

Figure 26:
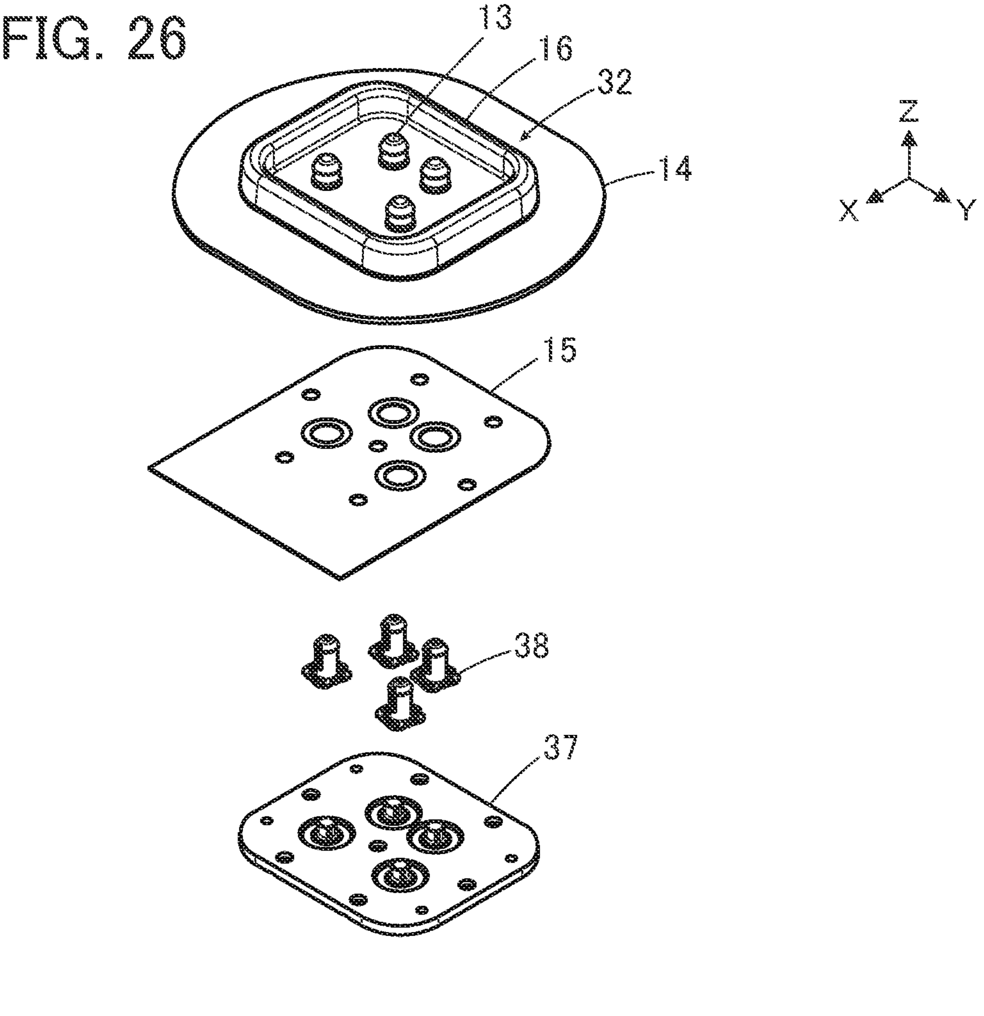
FIG. 26 is an exploded perspective view of the connector according to Embodiment 3.

FIG. 26 shows an exploded perspective view of the connector 31. The connector 31 includes the top insulator 16 used in Embodiment 1, and a bottom insulator 37, and these top and bottom insulators 16 and 37 constitute the housing 32.

Four inner contacts 38 are disposed on the −Z direction side of the sheet type conductive member 15, and the bottom insulator 37 is disposed on the −Z direction side of the inner contacts 38.

Figure 27:
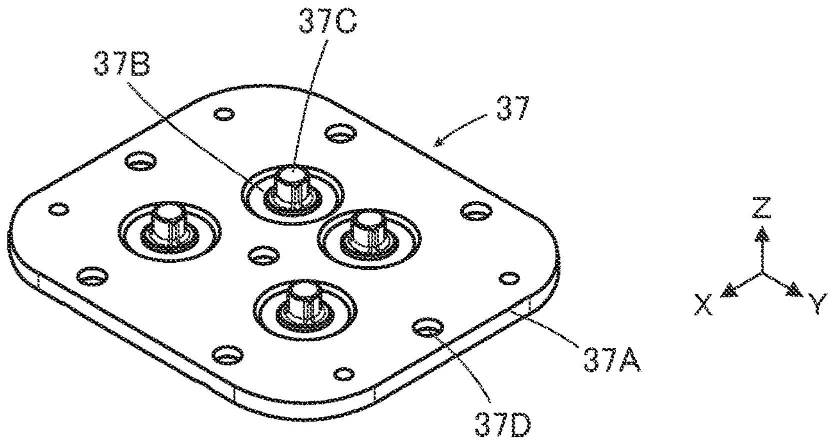
FIG. 27 is a perspective view showing a bottom insulator used in the connector of Embodiment 3.

As shown in FIG. 27, the bottom insulator 37 includes a flat plate portion 37A, and the flat plate portion 37A is provided with four circular recessed portions 37B opening in the +Z direction. The four recessed portions 37B are separately provided with four projections 37C projecting in the +Z direction from center parts of the recessed portions 37B.

In addition, the flat plate portion 37A is provided with a plurality of through-holes 37D separately corresponding to the plurality of bosses 16C of the top insulator 16.

Figure 28:
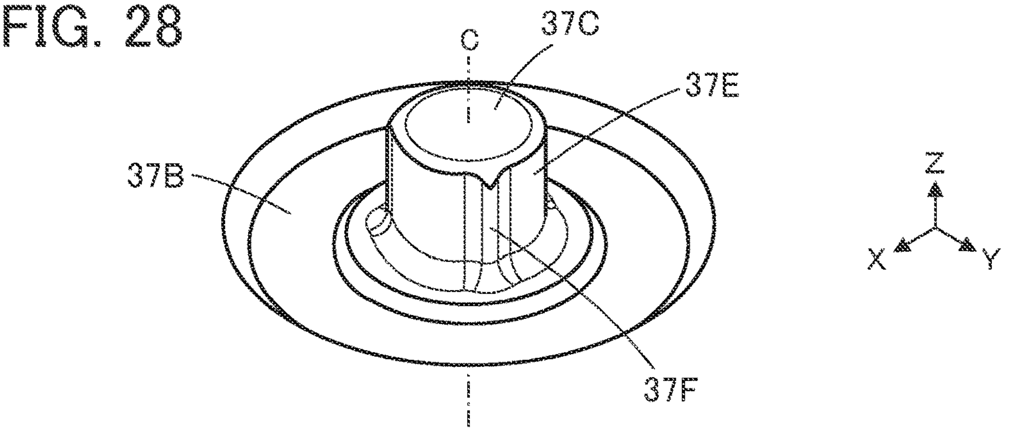
FIG. 28 is a perspective view showing a projection of the bottom insulator used in the connector of Embodiment 3.

As shown in FIG. 28, the projection 37C formed in the recessed portion 37B of the bottom insulator 37 is configured to temporarily retain the inner contact 38 and includes a columnar portion 37E extending in the Z direction, and a plurality of temporarily retaining pieces 37F formed to project on an outer periphery of the columnar portion 37E.

Figure 29:
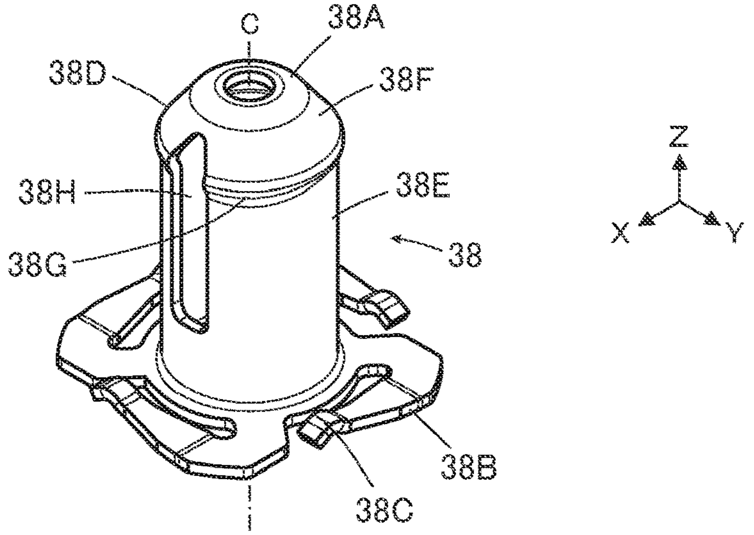
FIG. 29 is a perspective view showing an inner contact used in the connector of Embodiment 3.

As shown in FIG. 29, the inner contact 38 is made of a conductive material such as metal and includes a retaining portion 38A, a plurality of spring portions 38B connected to a −Z directional end portion of the retaining portion 38A, and a plurality of connecting portions 38C connected to tips of the spring portions 38B.

The retaining portion 38A includes an elastically deformable insertion portion 38D of tubular shape through which the fitting axis C of the corresponding plug contact 13 passes. The insertion portion 38D is configured to be inserted into the recessed portion 13C of the plug contact 13 and has a cylindrical portion 38E of cylindrical shape extending along the fitting axis C in the Z direction, and a reduced diameter portion 38F connected to a +Z directional end portion of the cylindrical portion 38E and extending to be tapered toward the +Z direction along the fitting axis C. A −Z directional end portion of the reduced diameter portion 38F connected to the cylindrical portion 38E is provided with a hook portion 38G overhanging in a radial direction along an XY plane farther away from the cylindrical portion 38E.

While the cylindrical portion 38E of the insertion portion 38D has a cylindrical shape, the shape thereof is not limited thereto, and tubular shapes having various cross-sectional shapes such as an elliptical shape and a polygonal shape may be adopted.

In addition, the insertion portion 38D is provided with a single slit 38H extending in the Z direction to extend over the cylindrical portion 38E and the reduced diameter portion 38F and penetrating the conductive material, forming the inner contact 38, in the thickness direction of the conductive material.

It should be noted that the diameter of the hook portion 38G is set to be slightly larger than an inside diameter of the recessed portion 13C of the plug contact 13. Therefore, when the insertion portion 38D of the inner contact 38 is inserted into the recessed portion 13C of the plug contact 13, the hook portion 38G comes into contact with the inner surface of the recessed portion 13C, and the insertion portion 38D is elastically deformed in an XY plane such that the width of the slit 38H decreases.

The plurality of spring portions 38B extend from a −Z directional end portion of the cylindrical portion 38E while being curved in the same rotation direction along an outer periphery of the cylindrical portion 38E, with the fitting axis C being the center of the rotation. Each spring portion 38B is formed of a plate spring that extends along an XY plane and is elastically deformable in the Z direction, and the connecting portion 38C is disposed at a tip of the spring portion 38B. Because the spring portion 38B elastically deforms, the connecting portion 38C is configured to be elastically deformable in the Z direction.

The four contact through-holes 16B of the top insulator 16, the four plug contacts 13, the four contact arrangement regions 15A of the sheet type conductive member 15, the four inner contacts 38, and the four recessed portions 37B of the bottom insulator 37 are arranged so as to align with each other in the Z direction.

In addition, the bosses 16C of the top insulator 16, the cutouts 14B of the reinforcement sheet 14, the through-holes 15G of the sheet type conductive member 15, and the through-holes 37D of the bottom insulator 37 are arranged so as to align with each other in the Z direction.

Figure 30:
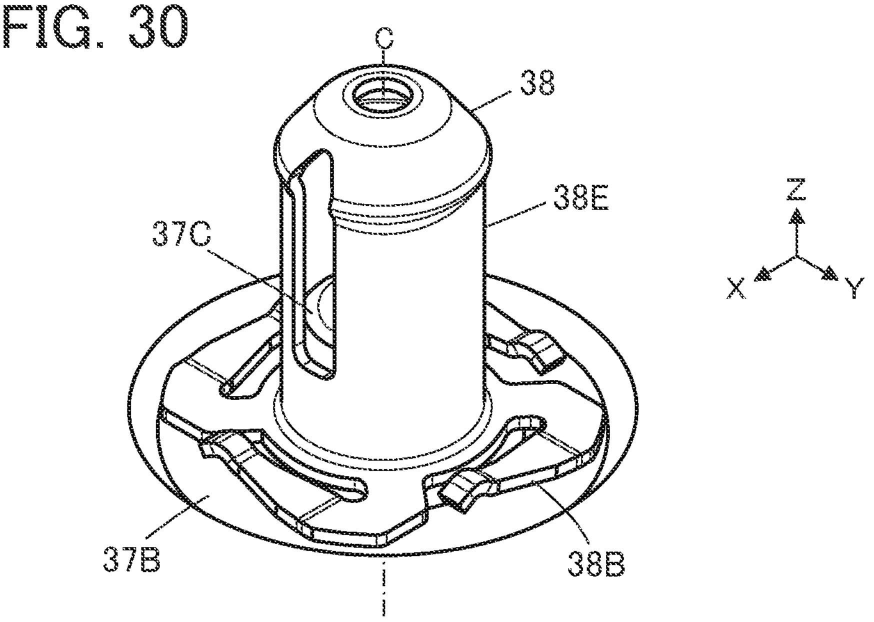
FIG. 30 is a perspective view showing the inner contact temporarily retained by the projection of the bottom insulator.

When the connector 31 is assembled, first, as shown in FIG. 30, the inner contact 38 is temporarily retained by the projection 37C of the corresponding recessed portion 37B of the bottom insulator 37. Specifically, the inner contact 38 can be temporarily retained by the projection 37C by putting the cylindrical portion 38E of the inner contact 38 over the projection 37C. At this time, the plurality of spring portions 38B of the inner contact 38 are accommodated in the recessed portion 37B of the bottom insulator 37.

Similarly, the inner contacts 38 are temporarily retained separately by the projections 37C of the four recessed portions 37B of the bottom insulator 37.

Figure 31:
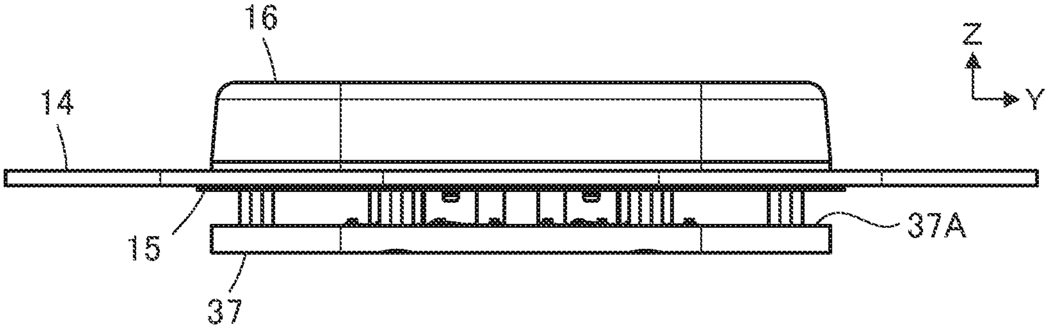
FIG. 31 is a front view showing the connector according to Embodiment 3 in the process of assembling.

Next, the bosses 16C of the top insulator 16 are separately inserted into the cutouts 14B of the reinforcement sheet 14, the tubular portion 13A of each of the plug contacts 13 is inserted from the −Z direction into the corresponding one of the four contact through-holes 16B of the top insulator 16, and as shown in FIG. 31, the bottom insulator 37 is pressed toward the top insulator 16 in the +Z direction with the sheet type conductive member 15 being sandwiched therebetween.

Figure 32:
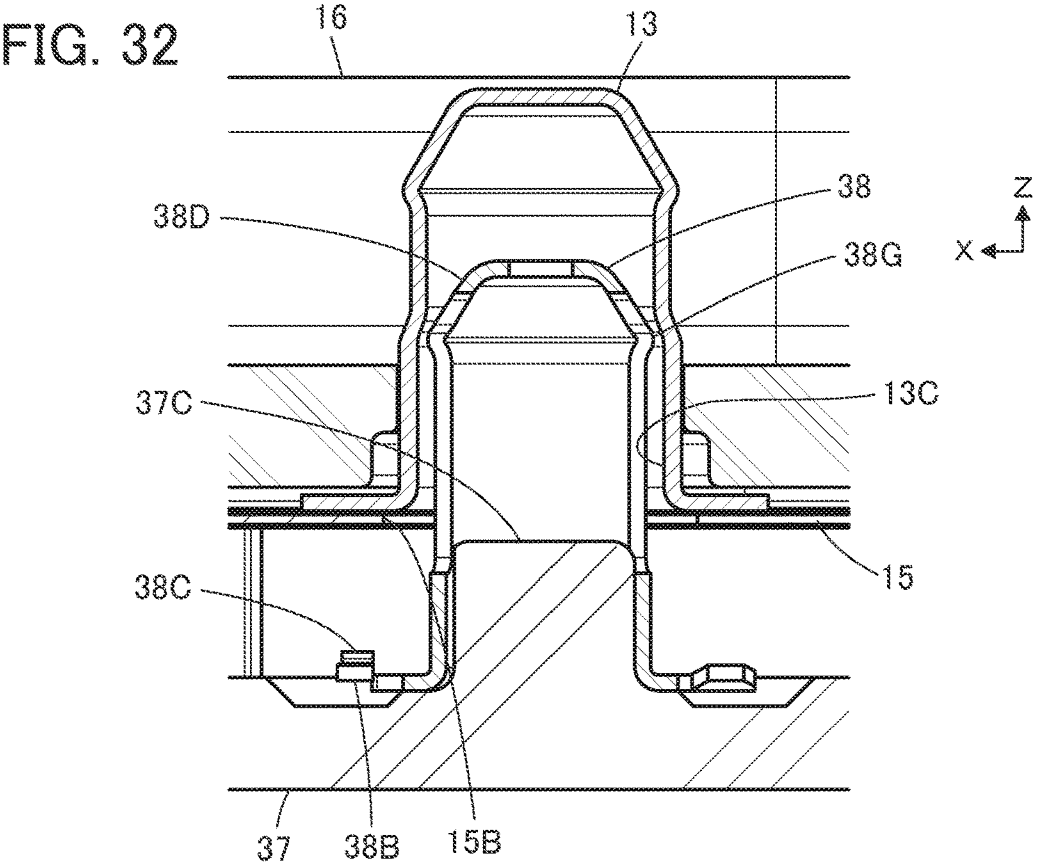
FIG. 32 is a partial cross-sectional side view of the connector of Embodiment 3 in the process of assembling, showing a state of an inside of the plug contact into which the inner contact is inserted.

At this time, as shown in FIG. 32, the insertion portion 38D of the inner contact 38 temporarily retained by the projection 37C of the bottom insulator 37 is inserted into the recessed portion 13C of the corresponding plug contact 13 through the opening portion 15B of the sheet type conductive member 15. Since the diameter of the hook portion 38G disposed in the insertion portion 38D is set to be slightly larger than the inner diameter of the recessed portion 13C of the plug contact 13, the hook portion 38G comes into contact with the inner surface of the recessed portion 13C, whereby the insertion portion 38D moves in the +Z direction within the recessed portion 13C while being elastically deformed such that the width of the slit 38H shown in FIG. 29 decreases.

Figure 33:
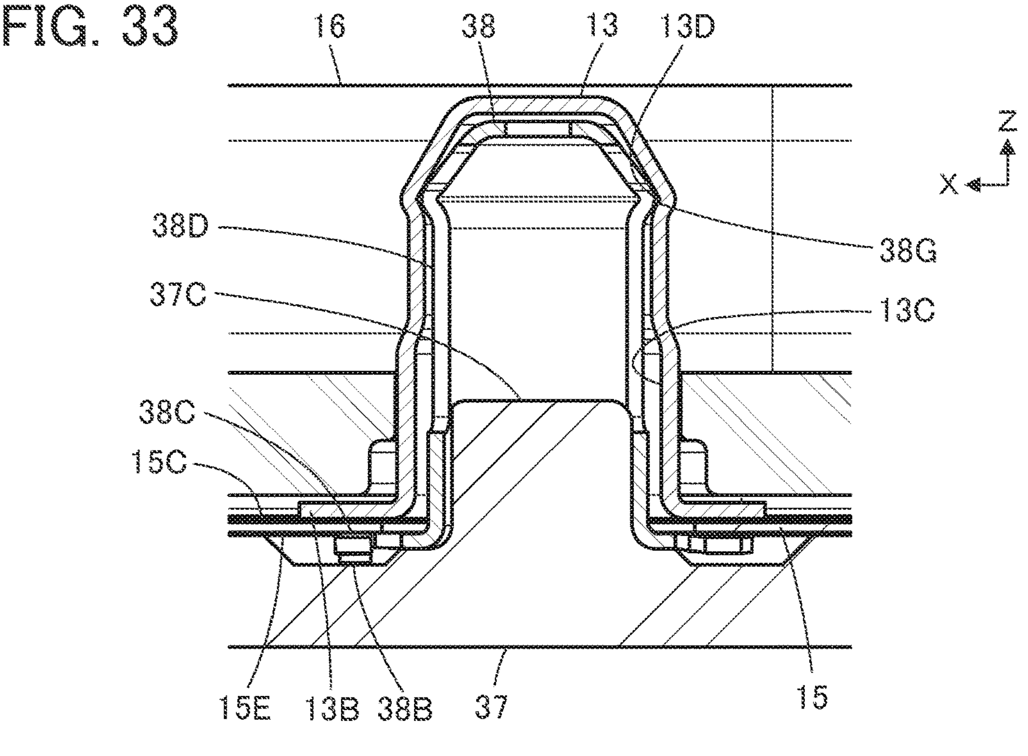
FIG. 33 is a partial cross-sectional side view of the connector of Embodiment 3 connected to the connection object, showing a state of the inside of the plug contact into which the inner contact is inserted.
Figure 34:
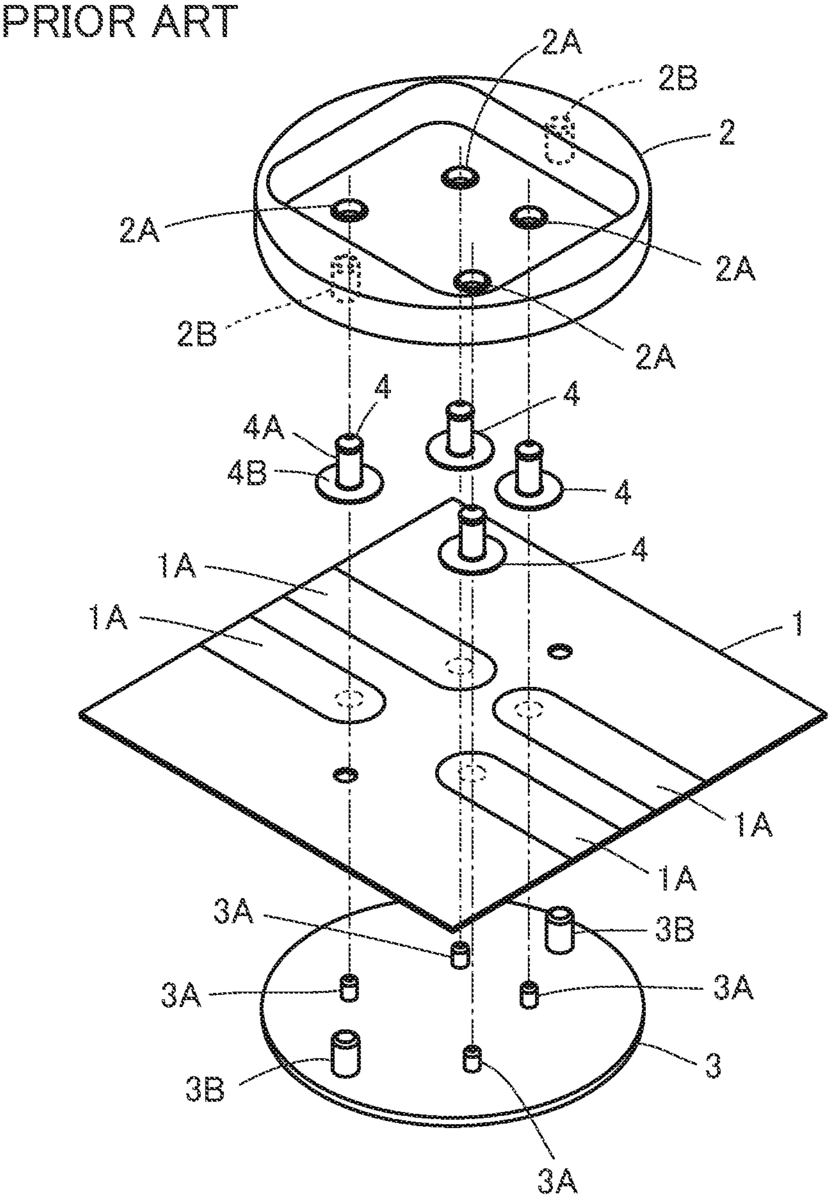
FIG. 34 PRIOR ART
FIG. 34 is an exploded perspective view showing a conventional connector.
Figure 35:
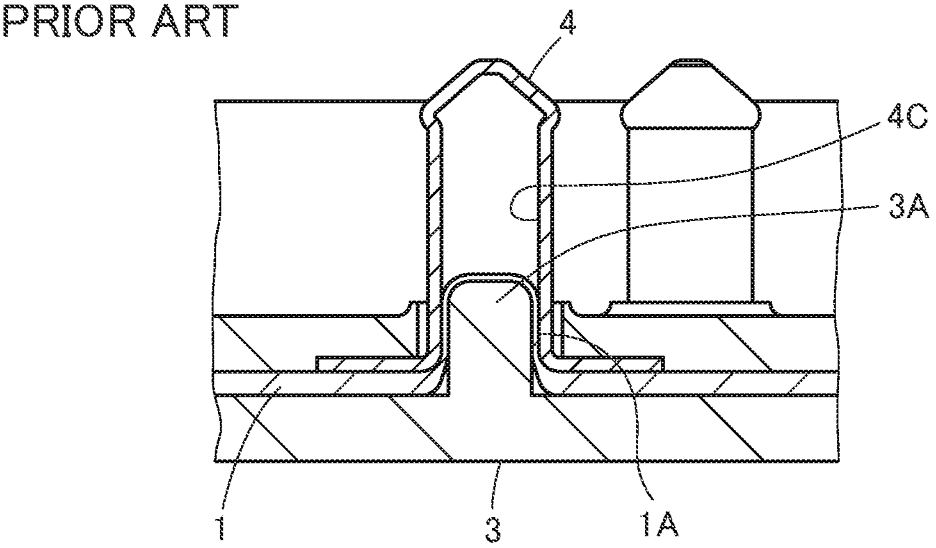
FIG. 35 PRIOR ART
FIG. 35 is a partial cross-sectional view showing the conventional connector.

When the insertion portion 38D is further inserted into the recessed portion 13C in this manner, as shown in FIG. 33, the receiving portion 13D formed inside the recessed portion 13C receives the hook portion 38G. Consequently, the insertion portion 38D of the inner contact 38 is retained in the recessed portion 13C of the plug contact 13, and the hook portion 38G of the insertion portion 38D is pressed against the inner surface of the recessed portion 13C of the plug contact 13, whereby the inner contact 38 is electrically connected to the plug contact 13.

In addition, by pressing the bottom insulator 37 against the top insulator 16, the bosses 16C of the top insulator 16 sequentially penetrate the cutouts 14B of the reinforcement sheet 14, the through-holes 15G of the sheet type conductive member 15, and the through-holes 37D of the bottom insulator 37. Thereafter, the top insulator 16 and the bottom insulator 37 are fixed to each other through heat deformation of a tip of each of the plurality of bosses 16C projecting on the −Z direction side of the bottom insulator 37. Thus, the assembling operation of the connector 31 is completed.

When the bottom insulator 37 is pressed toward the top insulator 16 until the receiving portion 13D of the recessed portion 13C receives the hook portion 38G of the insertion portion 38D, as shown in FIG. 33, the sheet type conductive member 15 is sandwiched between front surfaces on the +Z direction side of the connecting portions 38C separately disposed at tips of the spring portions 38B of the inner contact 38 and the rear surface on the −Z direction side of the flange 13B of the plug contact 13.

Therefore, the spring portions 38B of the inner contact 38 elastically deform in the Z direction, and a pressing force acting in the +Z direction is applied to the connecting portions 38C separately disposed at the tips of the spring portions 38B. Consequently, the front surface on the +Z direction side of the sheet type conductive member 15 is pressed against the rear surface of the flange 13B of the plug contact 13, while the rear surface on the −Z direction side of the sheet type conductive member 15 is pressed against the front surfaces of the connecting portions 38C of the inner contact 38. As a result, the wiring layer 15C on the front surface of the sheet type conductive member 15 makes contact with the rear surface of the flange 13B of the plug contact 13 with predetermined contact pressure, while the wiring layer 15E on the rear surface of the sheet type conductive member 15 makes contact with the front surfaces of the connecting portions 38C of the inner contact 38 with predetermined contact pressure.

Therefore, the wiring layer 15C exposed on the front surface of the sheet type conductive member 15 is electrically connected to the plug contact 13 directly, while the wiring layer 15E exposed on the rear surface of the sheet type conductive member 15 is electrically connected to the plug contact 13 via the inner contact 38. That is, both the wiring layers 15C and 15E are connected to the plug contact 13.

Thus, also with the connector 31 of Embodiment 3, both the wiring layer 15C and the wiring layer 15E respectively formed of the conductor disposed on the front surface side and the conductor disposed on the rear surface side of the sheet type conductive member 15 can be electrically connected to the single plug contact 13.

While each of the connecting portions 18C, 19C of the inner contacts 18, 19 in Embodiment 1 has a flat plate shape as shown in FIGS. 8 and 16, a spring portion similar to the spring portions 38B of the inner contact 38 in Embodiment 3 shown in FIG. 29 may be added to these connecting portions 18C and 19C.

While the plug contact 13 arranged in the contact arrangement region 15A of the sheet type conductive member 15 is connected to both the wiring layer 15C and the wiring layer 15E respectively exposed on the front surface side and the rear surface side of the sheet type conductive member 15 in Embodiments 1 to 3 above, only the wiring layer 15E exposed on the rear surface side of the sheet type conductive member 15 may be connected to the plug contact 13 arranged in the contact arrangement region 15A, for instance.

While the sheet type conductive member 15 used in Embodiments 1 to 3 above has a multilayer structure, the invention is not limited thereto, and it suffices if the sheet type conductive member has a conductor exposed on at least one surface thereof.

In addition, while the two layers of the conductors, i.e., the wiring layer 15C and the wiring layer 15E of the sheet type conductive member 15, are connected to the single plug contact 13 in Embodiments 1 to 3 above, the invention is not limited thereto, and three or more layers of conductors may be connected to the single plug contact 13.

In addition, while the connector 11, 21, 31 according to Embodiments 1 to 3 above has the four plug contacts 13, the invention is not limited to this number of the plug contacts 13, and it suffices if the connector includes at least a single plug contact 13 to be electrically connected to a conductor exposed on at least one surface of the sheet type conductive member 15.

While the reinforcement sheet 14 is disposed between the bottom insulator 17, 27, 37 and the top insulator 16 in Embodiments 1 to 3 above, the reinforcement sheet 14 may be omitted when it is not necessary to reinforce a mounting object such as a garment to which the connector 11, 21, 31 is to be attached.

What is claimed is:

1. A connector comprising:

a plug contact having conductivity, the plug contact including a tubular portion extending along a fitting axis with a recessed portion formed therein, and a flange extending from an end portion of the tubular portion in a direction orthogonal to the fitting axis; and an inner contact having conductivity, part of the inner contact being inserted in the recessed portion, wherein the inner contact includes a retaining portion retained in the recessed portion and making contact with an inner surface of the recessed portion to be electrically connected to the plug contact, a connecting portion extending in the direction orthogonal to the fitting axis and facing a rear surface of the flange, and a spring portion joining the connecting portion to the retaining portion so as to be elastically displaceable along the fitting axis, and wherein part of a connection object of sheet shape having a conductor exposed on at least one surface of the connection object is sandwiched between the rear surface of the flange of the plug contact and the connecting portion of the inner contact in a direction along the fitting axis, the rear surface of the flange makes contact with a front surface of the connection object, and the connecting portion makes contact with a rear surface of the connection object, whereby the plug contact is electrically connected to the conductor directly when the conductor is exposed on the front surface of the connection object, and the plug contact is electrically connected to the conductor via the inner contact when the conductor is exposed on the rear surface of the connection object.

2. The connector according to claim 1, wherein the retaining portion includes a hook portion projecting in the direction orthogonal to the fitting axis, wherein the plug contact includes a receiving portion formed inside the recessed portion and receiving the hook portion, and wherein when the receiving portion receives the hook portion, the inner contact is retained in the recessed portion.

3. The connector according to claim 2, wherein the retaining portion includes a pair of hook portions projecting in opposite directions to each other in the direction orthogonal to the fitting axis, the pair of hook portions each comprising the hook portion and being disposed to be elastically displaceable in the direction orthogonal to the fitting axis.

4. The connector according to claim 3, wherein the inner contact is formed of a single bent metal sheet and includes the spring portion connected to the pair of hook portions and extending along the fitting axis while being bent in the direction orthogonal to the fitting axis, and the connecting portion of flat plate shape connected to the spring portion and facing the rear surface of the flange, and wherein the connecting portion is elastically displaced toward the rear surface of the flange portion by the spring portion.

5. The connector according to claim 4, wherein the pair of hook portions are disposed so as to be elastically displaceable in a direction orthogonal to a sheet thickness direction of a part of the metal sheet forming the hook portions.

6. The connector according to claim 4, wherein the pair of hook portions are disposed so as to be elastically displaceable in a sheet thickness direction of a part of the metal sheet forming the hook portions.

7. The connector according to claim 4, wherein the inner contact includes a beam portion extending between the retaining portion and the spring portion in the direction orthogonal to the fitting axis, and wherein the beam portion is pushed up in the fitting direction, whereby the receiving portion receives the hook portions.

8. The connector according to claim 7, further comprising a bottom insulator having a projection inserted in the recessed portion, wherein the beam portion is pushed up in the fitting direction by the projection.

9. The connector according to claim 3, wherein the inner contact is formed of a single bent metal sheet of band shape and includes a pair of spring portions each comprising the spring portion and separately connected to the pair of hook portions, and a pair of connecting portions each comprising the connecting portion and separately connected to the pair of spring portions.

10. The connector according to claim 9, wherein the pair of spring portions separately include a pair of bent portions disposed on opposite sides across the fitting axis and projecting toward the fitting axis; and wherein the pair of connecting portions separately extend from tips of the pair of spring portions in directions away from the fitting axis.

11. The connector according to claim 10, further comprising a bottom insulator having a projection inserted in the recessed portion, wherein the projection has a retaining groove for retaining the inner contact.

12. The connector according to claim 11, wherein the pair of bent portions are separately pushed in directions away from the fitting axis by the projection within the recessed portion, whereby the pair of connecting portions are elastically displaced toward the rear surface of the flange by the pair of spring portions.

13. The connector according to claim 2, wherein the retaining portion includes an insertion portion of tubular shape that is elastically deformable, the insertion portion being inserted in the recessed portion and projecting along the fitting axis, wherein the hook portion is disposed at an outer periphery of the insertion portion, wherein the spring portion is formed of a plate spring extending from an end portion of the insertion portion in a plane orthogonal to the fitting axis, and wherein the connecting portion is disposed at a tip of the spring portion and elastically displaced toward the rear surface of the flange by the spring portion.

14. The connector according to claim 13, wherein the insertion portion includes a cylindrical portion extending along the fitting axis, and a reduced diameter portion joined to a tip of the cylindrical portion and extending to be tapered along the fitting axis, and wherein the reduced diameter portion includes the hook portion disposed along a circumference of a joint portion between the reduced diameter portion and the cylindrical portion and overhanging in a radial direction farther away from the cylindrical portion.

15. The connector according to claim 14, wherein the insertion portion includes a slit extending along the fitting axis so as to extend over the cylindrical portion and the reduced diameter portion, and is elastically deformed in a circumferential direction of the cylindrical portion such that a width of the slit decreases.

16. The connector according to claim 14, wherein the spring portion extends from a base end of the cylindrical portion and is curved along an outer periphery of the cylindrical portion.

17. The connector according to claim 16, wherein the insertion portion includes a plurality of spring portions each of which is the spring portion and is curved from the base end of the cylindrical portion in a same rotation direction about the fitting axis, the fitting axis being a center of the rotation, and wherein a plurality of connecting portions each comprising the connecting portion are separately disposed at tips of the plurality of the spring portions.

18. The connector according to claim 13, further comprising a bottom insulator having a projection configured to be inserted in the insertion portion and temporarily retain the inner contact.

19. The connector according to claim 1, further comprising a top insulator provided with a contact through-hole that is penetrated by the tubular portion of the plug contact and is smaller than the flange.

* * * * *